| (12) | United States Patent | (10) Patent No.: | US 8,849,830 B1 |
|---|---|---|---|
| | Srinivasan et al. | (45) Date of Patent: | *Sep. 30, 2014 |

(54) DELIVERING SEARCH RESULTS

(75) Inventors: Seshadri Srinivasan, Los Altos, CA (US); Wang Lam, San Jose, CA (US); Gaurav Bhalotia, Mountain View, CA (US); Venky Harinarayan, Saratoga, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 5 days.

This patent is subject to a terminal disclaimer.

(21) Appl. No.: 11/580,521

(22) Filed: Oct. 13, 2006

(51) Int. Cl.
*G06F 17/30* (2006.01)

(52) U.S. Cl.
USPC .......................................................... 707/740

(58) Field of Classification Search
USPC ........... 707/E17.095, E17.102, 726, 731, 740
See application file for complete search history.

(56) References Cited

U.S. PATENT DOCUMENTS

| 6,285,999 | B1 * | 9/2001 | Page ..................................... 1/1 |
| 6,385,602 | B1 * | 5/2002 | Tso et al. ................ 707/999.003 |
| 7,613,687 | B2 * | 11/2009 | Nye ...................................... 1/1 |
| 7,739,209 | B1 * | 6/2010 | Rajaraman ....................... 706/20 |
| 7,788,274 | B1 * | 8/2010 | Ionescu .......................... 707/763 |
| 2002/0078045 | A1 * | 6/2002 | Dutta ................................. 707/7 |
| 2005/0144162 | A1 | 6/2005 | Liang |
| 2006/0004717 | A1 * | 1/2006 | Ramarathnam et al. ........... 707/3 |
| 2009/0106241 | A1 * | 4/2009 | Blackwell ......................... 707/5 |

FOREIGN PATENT DOCUMENTS

| EP | 1160683 A2 * | 12/2001 |
| GB | 2379290 A * | 3/2003 |

OTHER PUBLICATIONS

Sherman, Humans Do It Better: Inside the Open Directory Project, Jul. 2000.*
Sankar K. Pal, A Web Surfer Model Incorporating Topic Continuity, IEEE Transactions on Knowledge and Data Engineerin, vol. 17, No. 5, May 2005, pp. 726-729.*
B.D. Davison, "Unifying Text and Link Analysis," Proc. Int'l Joint Conf. Artificial Intelligence Workshop Text-Mining & Link-Analysis (TextLink), 2003, pp. 1-3.*
B.L. Narayan, C.A. Murthy, and S.K. Pal, "Topic Continuity for Web Document Categorization and Ranking," Proc. 2003 IEEE/WIC Int'l Conf. Web Intelligence, 2003, pp. 310-315.*
Borodin et al., Finding Authorities and Hubs From Link Structures on the World Wide Web, In Proceedings of the Tenth International World Wide Web Conference, Jan. 18, 2002.
Taher H. Haveliwala, Topic-Sensitive PageRank: A Context-Sensitive Ranking Algorithm for Web Search, In Proceedings of the Eleventh International World Wide Web Conference, 2002.
Jeh et al., Scaling Personalized Web Search, In Proceedings of the Twelfth International World Wide Web Conference, 2003.
Jon M. Kleinberg, Authoritative Sources in a Hyperlinked Environment, Journal of the ACM, 1999.
Lempel et al., The Stochastic Approach for Link-Structure Analysis (SALSA) and the TKC Effect, 2000.

(Continued)

*Primary Examiner* — Albert Phillips, III
(74) *Attorney, Agent, or Firm* — David R. Stevens; Stevens Law Group

(57) ABSTRACT

Delivering a search result is disclosed. A category is associated with a document based at least in part on one or more scores that measure the relevance of that document to a base category. A search query is obtained. One or more results is delivered in a manner that includes an indication of at least one category with which the result is associated.

20 Claims, 30 Drawing Sheets

(56) References Cited

OTHER PUBLICATIONS

Ng et al., Stable Algorithms for Link Analysis, In Proceedings the Twenty-Fourth Annual International ACM SIGIR Conference, 2001.

Page et al., The PageRank Citation Ranking: Bringing Order to the Web, 1998.

Richardson et al., The Intelligent Surfer: Probabilistic Combination of Link and Content Information in PageRank, 2002.

Soumen Chakrabarti, Mining the Web: Discovering Knowledge from Hypertext Data, 2002.

\* cited by examiner

|  | Animals | Businesses | Cars | Computers | Education | Physics |
|---|---|---|---|---|---|---|
| www.vets.com/index.html ~ 306 | 0.9 | 0.9 | 0.0 | 0.0 | 0.2 | 0.0 |
| www.apple.com/OS/jaguar.html | 0.2 | 0.7 | 0.0 | 0.9 | 0.0 | 0.0 |
| amazon.com/reviews/quark.html | 0.2 | 0.5 | 0.0 | 0.2 | 0.3 | 0.95 |
| autos.org/classic_cars.html | 0.1 | 0.4 | 0.9 | 0.1 | 0.2 | 0.0 |
| yahoo.com      ~ 310 | 0.5 | 0.5 | 0.5 | 0.5 | 0.5 | 0.5 |
| learntoreadhiroglyphs.com | 0.2 | 0.1 | 0.0 | 0.0 | 0.7 | 0.0 |

Fig. 3A

| URL | Categor[y/ies] |
|---|---|
| www.vets.com/index.html | Animals, Business |
| www.apple.com/OS/jaguar.html | Computers |
| amazon.com/reviews/quark.html | Physics |
| autos.org/classic_cars.html | Cars |
| yahoo.com | * |
| learntoreadhiroglyphs.com | Education |

Fig. 3B

| |
|---|
| www.vets.com/index.html [0.9,0.9,0.0,0.0,0.2,0.0] |
| www.apple.com/OS/jaguar.html [0.2,0.7,0.0,0.9,0.0,0.0] |
| amazon.com/reviews/quark.html [0.2,0.5,0.0,0.2,0.3,0.95] |
| autos.org/classic_cars.html [0.1,0.4,0.9,0.1,0.2,0.0] |
| yahoo.com [0.5,0.5,0.5,0.5,0.5,0.5] |
| learntoreadhiroglyphs.com [0.2,0.1,0.0,0.0,0.7,0.0] |

Fig. 3C

Search Results – Relevance ("Jaguar")

1. jaguar.com    [cars] ⟵502    more in this category ⟵504
                                  exclude this category ⟵506

2. zoo.org    [more in "animals"] ⟵504    [exclude "animals"] ⟵506

3. apple.com/macosx    ☐ show me more Computer results ⟵504
                        ☒ don't show me Computer results ⟵506

4. jaguar.com/corporate    +cars ⟵504    +businesses ⟵504
                           −cars ⟵506    −businesses ⟵506

Fig. 5

|  | Original Random Walk | Dual Random Walk |
| --- | --- | --- |
| Links | Inlinks, Outlinks | Invert the link direction |
| Outbound Link Probability | Uniformly Distributed | Proportional to Effective Page Rank (in original Web Graph) of destination: (Page Rank/ # Outlinks) |
| Outbound Teleportation | Uniform for all Pages (1-β) | Inversely proportional to Page Rank |
| Inbound Teleportation | Uniform (1/N) | Proportional to Page Rank |
| Page Rank | P(k) | P(k) |

FIG. 20 ial Patent
DELIVERING SEARCH RESULTS

CROSS REFERENCE TO OTHER APPLICATIONS

This application claims priority to U.S. Provisional Patent Application No. 60/726,828 entitled DELIVERING SEARCH RESULTS filed Oct. 14, 2005 which is incorporated herein by reference for all purposes.

BACKGROUND OF THE INVENTION

Search engines, such as are used in conjunction with the Word Wide Web, are typically expected to search through vast amounts of data, yet return a manageable number of quality, relevant results. When attempting to determine which results are most relevant to a user, search engines generally evaluate prospective results for such factors as the number of occurrences of a search term and how close to the top of the document the search term occurs.

In some cases, the relevancy of a particular result may depend on the context of the query. For example, suppose that a user submits a query of "jaguar price." Typically, search engines do not differentiate results based on context and thus the same hits will be displayed to the user, irrespective of whether that user is interested in the car, the cat, or the operating system. There thus exists a continuing need to be able to provide relevant results in response to queries.

BRIEF DESCRIPTION OF THE DRAWINGS

Various embodiments of the invention are disclosed in the following detailed description and the accompanying drawings.

FIG. 3A illustrates an embodiment of data used by a search server.

FIG. 3B illustrates an embodiment of data used by a search server.

FIG. 3C illustrates an embodiment of data used by a search server.

FIG. 5 illustrates an example of an embodiment of a display of search results.

FIG. 20 is a table illustrating properties of walks.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
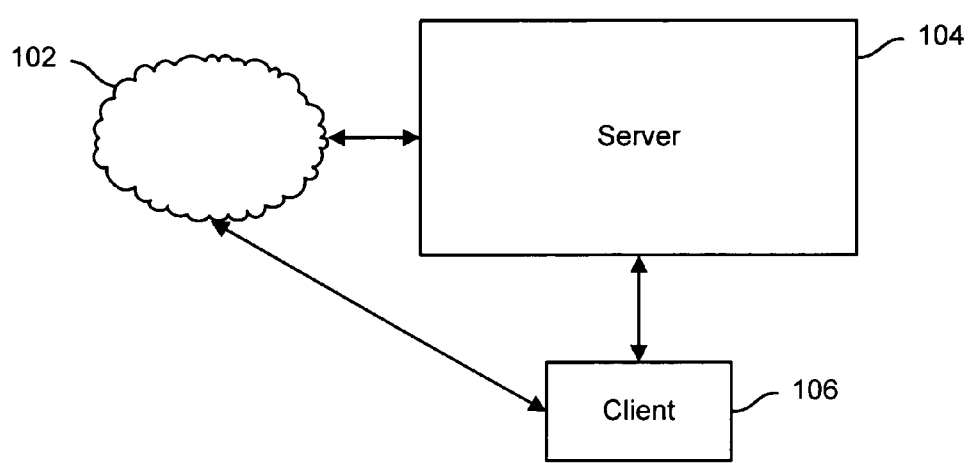
FIG. 1 illustrates an embodiment of a search system.

FIG. 1 illustrates an embodiment of a search system. In the example shown, collection 102 is a group of World Wide Web pages, and is crawled and indexed by a search server 104. Client 106 submits queries to search server 104, and search server 104 returns results from collection 102. Hereinafter, when an operation is discussed as being performed on each document in collection 102, it should be understood that the operation may instead be performed on a subset of collection 102, as applicable. The documents in collection 102 are also referred to herein as "web nodes" and "web pages." In some embodiments, collection 102 includes documents found on an intranet. In some embodiments, collection 102 is a subset of the World Wide Web, or a subset of the documents found on an intranet, or a combination of such subsets. Documents found in collection 102 can include, but are not limited to text files, multimedia files, and other content. Search server 104 may be a single device, or its functionality may be provided by multiple devices. Elements typically provided in a search system, such as an indexer and a repository, are not shown but may be included.

As described more fully below, search server 104 assigns scores to the documents in collection 102. In some embodiments, DIFR and/or Topic Relevance are used to score at least a portion of the documents in collection 102.

Figure 2:
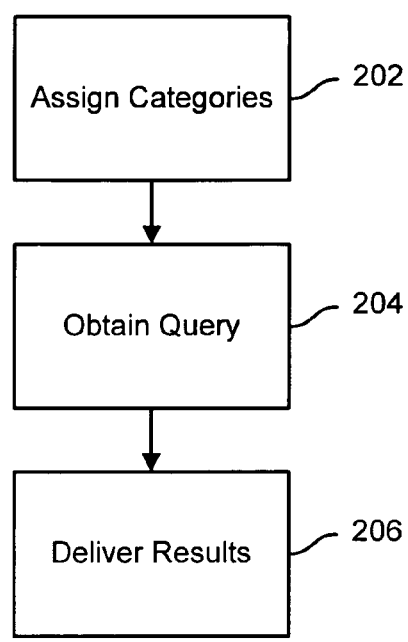
FIG. 2 illustrates an embodiment of a process for delivering a search result.

FIG. 2 illustrates an embodiment of a process for delivering a search result. The process begins at 202 when categories are assigned to documents in a collection. Hereinafter, categories are also referred to as flavors and topics. As described more fully below, a particular document may be relevant to a single category, or it may be relevant to multiple categories. Rather than a binary characteristic, its relevance may be described by a range of scores.

At 204, a query is obtained. The query may be obtained in a variety of ways. For example, a user may enter a search term into a web form provided by server 104 to client 106, a personal computer with a web browser. Other clients may also be used as applicable, such as a handheld device (such as a PDA), or a mobile phone.

At 206, results are delivered to the user. As described more fully below, results may be presented to the user in a variety of ways.

FIG. 3A illustrates an embodiment of data used by a search server. Matrix 300 is an abstraction of some of the data used by search server 104. As shown, Matrix 300 has along one axis the URLs of all documents in collection 102 (302). Along the other axis are assorted base topics (304).

Categories may be provided in various manners, such as by a human administrator. Thus, for example, an administrator may define the categories, "Education," "Business," and "Cooking," and select seed sets for those topics. In some cases, categories may be obtained from a third party, such as the Open Directory Project. As described in more detail below, virtual flavors can be formed by performing operations on groups of base flavors.

For each document, topic dependent scores are calculated. For example, flavor ranks (such as DIFR scores) and topic relevance scores are calculated, relative to each page. In this example, the DIFR and topic relevance scores of each page relative to a topic are combined into a composite score for that topic and normalized to range from 0.0 [not at all relevant] to 1.0 [extremely relevant]. Other methods of assigning topic dependent scores to pages may be used, as appropriate.

In the example shown, URL 306 [www.vets.com/index.html] has a relevance score of 0.9 with respect to the base category, "Animals." It has an equally high score in the category, "Businesses." It has a significantly lower score, 0.2, in the category, "Education," and zero relevance to the categories "Cars," "Computers," and "Physics."

Based at least in part on the computed scores, one or more categories can be assigned to each document. For example, search server 104 could store metadata associated with each document in collection 102, including the category or categories to which it "belongs," or is most relevant. A given document can thus be "tagged" with one or more categories.

FIG. 3B illustrates an embodiment of data used by a search server. As shown in FIG. 3B, one way of tagging a document is by determining the category in which the document has the highest score, and assigning that category as the category to which the document belongs. In the example shown, URL 306 has a score of 0.9 in two categories—Animals and Businesses, and is tagged as belonging to two categories (320). URL 308 [www.apple.com/OS/jaguar.html] is listed in this example as belonging only to the Computers category, in which it has a score of 0.9 (322).

Other methods of determining to which category or categories a document belongs may also be used as appropriate. For example, in some embodiments, rather than setting categories based on a maximum value, a threshold is applied. A document could be considered to belong to a category if it has a score above 0.65 in that category. In some embodiments, categories are assigned based on a combination of factors.

URL 310 is equally relevant to all categories. In this case, URL 310 is a popular search engine, and links to and is linked from a wide variety of sites.

A URL may also be equally relevant across categories because the page makes use of one or more link farms or a very popular, but unrelated site, to increase a topic-agnostic score, such as a PageRank® score. In this case, it is likely that the site is spam and in some embodiments it is penalized accordingly.

FIG. 3C illustrates an embodiment of data used by a search server. In the example shown, rather than being assigned to a particular category, search server 104 stores each URL's score in each category in an array.

Figure 4:
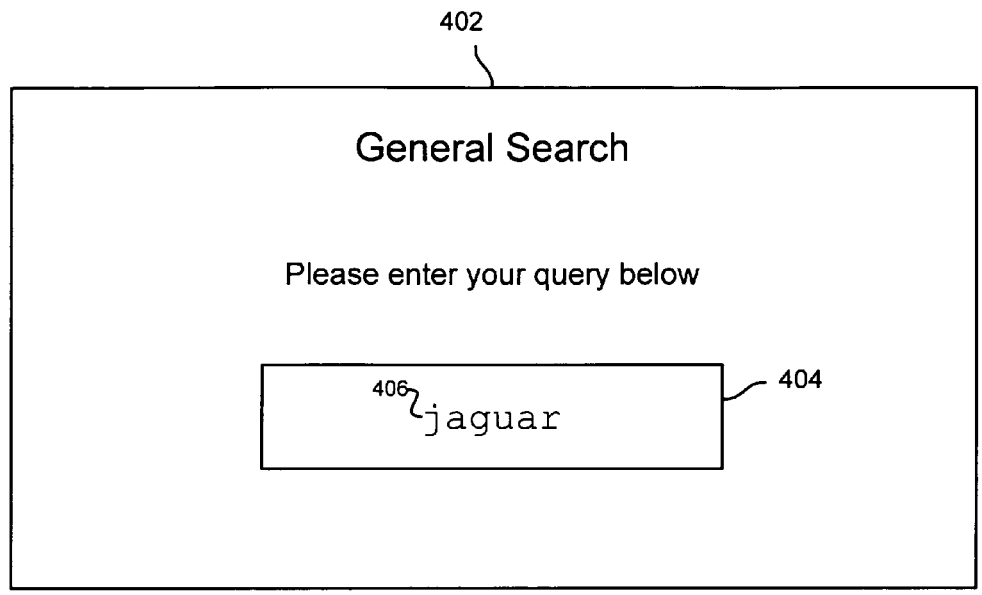
FIG. 4 illustrates an embodiment of an interface for obtaining a query.

FIG. 4 illustrates an embodiment of an interface for obtaining a query. The example shown is an implementation of portion 204 of the process performed in FIG. 2, as rendered in a browser. In this example, a web page 402 includes a form 404 into which a user can submit a query 406. Here, web page 402 provides general search capabilities, aimed at providing visitors the ability to search the entire web across all topics. In the example shown, the user has entered a query of "jaguar" (406).

FIG. 5 illustrates an example of an embodiment of a display of search results. The example shown is an implementation of portion 206 of the process performed in FIG. 2, as rendered in a browser. Results can be presented to the user in a variety of ways. In FIG. 5, the highest ranking results are displayed, irrespective of category (referred to herein as a "relevance view" of results). The results shown are the "best" pages relevant to the term, "jaguar." The determination of which pages are "best" can include such factors as text match scores and topic-agnostic scores such as PageRank®. The top results may come from one category, or from many categories. As described more fully below, one way of determining which results to show is to apply a max function.

The first result shown in FIG. 5, [jaguar.com], belongs to the "Cars" category, as indicated to the user at 502. The second result, [zoo.org], belongs to the "Animals" category.

The third result, [apple.com/macosx], belongs to the "Computer" category, and the fourth result, [jaguar.com/corporate] belongs to both the "Cars" and the "Businesses" categories.

Also included in FIG. 5 are options for manipulating results, presented in a variety of ways. In some embodiments, the options are presented in a uniform fashion (e.g., the same options are listed next to each result). In some embodiments, which options are presented may be customizable and/or may depend on factors such as to which category a result belongs.

In the example shown, a user may choose to view more results within a particular category (504), or the user may choose to exclude a particular category from searching (506). Several methods may be used to eliciting the user's response, such as through typical hyperlinks, radio buttons, check boxes, and so on.

If the user clicks on the "More in this category: Cars" link, the user will know that all of the results will be relevant to cars. Similarly, if the user is uninterested in Businesses, the user may easily remove business-related results from the display. Sample methods for performing these operations are given in greater detail below.

Figure 6:
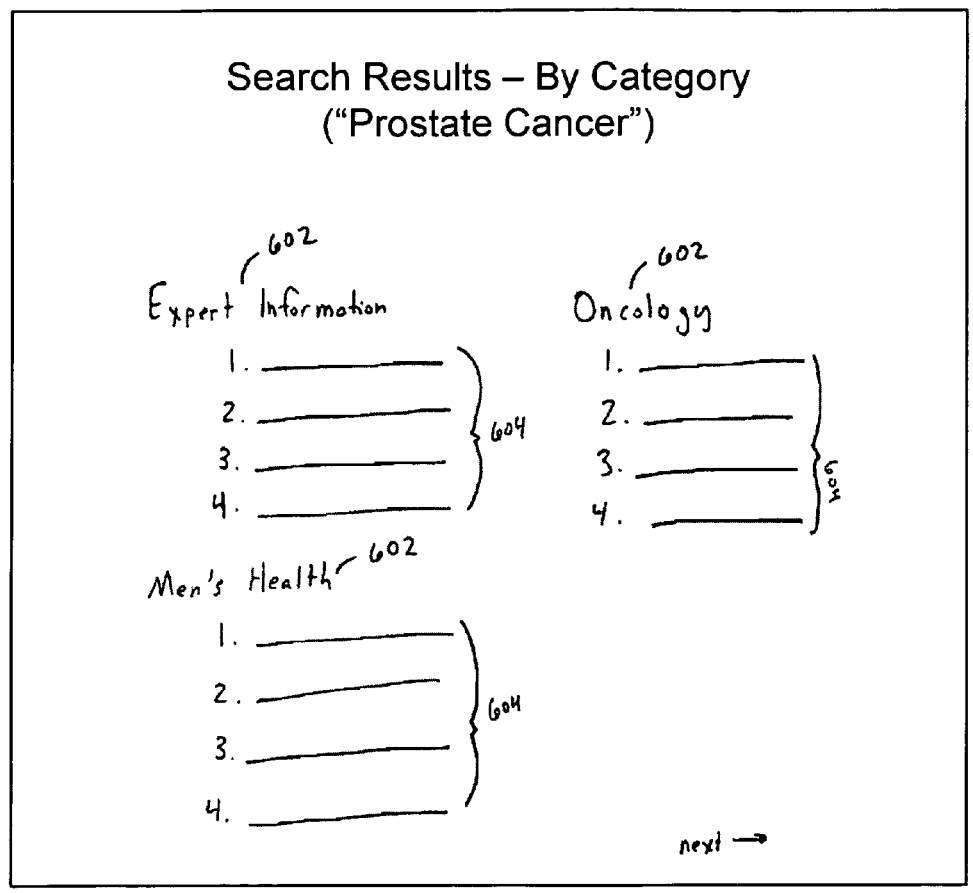
FIG. 6 illustrates an example of an embodiment of a display of search results.

FIG. 6 illustrates an example of an embodiment of a display of search results. The example shown is an implementation of portion 206 of the process performed in FIG. 2, as rendered in a browser. In the example shown, results are presented to a user sorted by category (referred to herein as a "category view" of results), rather than sorted by category-agnostic relevance as shown in FIG. 5. The category view provides a "bird's eye view" on a per category basis—the most relevant categories and their most relevant results, respectively, are displayed.

Suppose a user submits a query of "prostate cancer" to search server 104 (e.g., at 204 of the process shown in FIG. 2). In the example shown, three categories, each with four results, are displayed. In the category view, a user is presented with the categories most relevant to prostate cancer (602)—Expert Information, Men's Health, and Oncology—and provided results for those categories clustered together (604). Thus, in this example, a category such as "Pediatrics" will not be displayed in response to the query, or will require clicking several pages of "next" to reach.

If the meaning of a query is ambiguous, a user may generally find it helpful to be provided a view with multiple categories displayed. Suppose the documents in collection 102 are classified by hundreds or thousands of defined categories. Showing all 1,000 categories to a user and asking the user in which category the user is interested in exploring results further could potentially be very daunting to that user. In some embodiments, thresholding is applied to help determine whether/which categories are relevant to a particular query. Using "jaguar" as an example, cats, wildlife in general, operating systems, cars, and professional football are all relevant categories. Health, skiing, and knitting are probably not. The relevant categories would be presented to a user in an interface such as is shown in FIG. 6, while the irrelevant ones would be suppressed.

In some cases, a single category may be relevant to a particular query, with few, if any, other categories having relevance. This might be the case with very technical terms, such as "costovertebral angle." In this case, instead of providing 3-4 "most relevant" categories to a user, such as "Basic Medical Advice," the "Expert Information" category may be shown, exclusively. Similarly, in the case of the term, "boo-boo," a "Kids' Health" category may be immediately displayed, without any additional categories.

Figure 7:
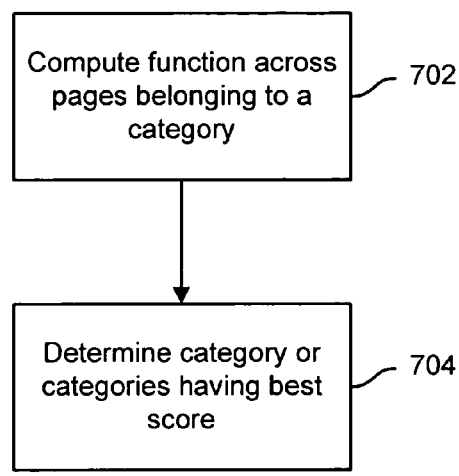
FIG. 7 is a flow chart illustrating an embodiment of a process for determining to which categories a search is related.

FIG. 7 is a flow chart illustrating an embodiment of a process for determining to which categories a search is related. The process begins at 702 when a function, such as an average, is computed across each page belonging to that category. The resulting score is the average score across all documents that belong to the category. In some embodiments, rather than averaging across all the documents belonging to a category, only a subset of documents, such as the top 100 documents are examined. This can help identify particularly good references, without penalizing categories for also having a lot of average results. A subset of a category's documents may also be processed at 702 for other reasons, such as performance considerations.

At 704, the category or categories with the highest average or averages is determined. Depending on factors such as the number of categories and their scores, the top categories may be based on rank (e.g., the top 5), or based on a threshold (having an average score over 0.5).

In some embodiments, virtual, or "composite" flavors are created by manipulating base flavors. For example, the broad, high-level category of "Health," may be formed by taking the union of base categories such as "Alternative Medicine," "Diet," "Surgery," and so on. The Health category may also be created from seeds. Similarly, a "Sports" virtual flavor can be formed by taking the union of base flavors such as "Football," "Swimming," "Wrestling," and so on. In some embodiments, a union of all categories is used to create a "General" category, such as might be used in the relevance view depicted in FIG. 5.

A variety of functions can be used to influence how flavors are combined. Taking a union may be a simple operation, or a complex operation, taking into account a wide variety of factors as appropriate.

Figure 8A:
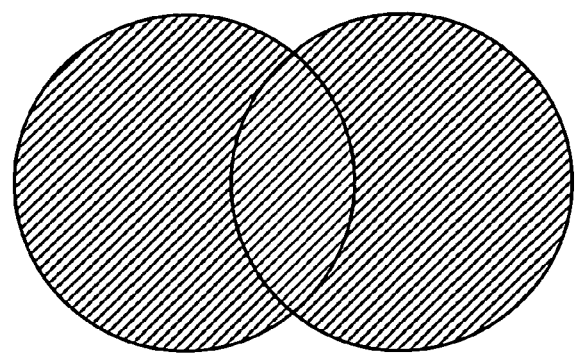
FIG. 8A represents the union of two flavors.
Figure 8B:
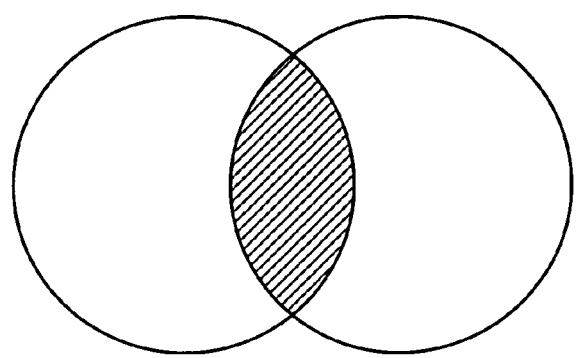
FIG. 8B represents the intersection of two flavors.
Figure 8C:
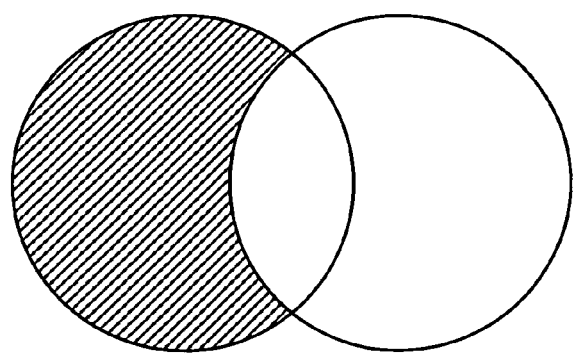
FIG. 8C represents the exclusion of a flavor.

FIGS. 8A-8C show three ways that two flavors can be combined. Other numbers of flavors can be manipulated similarly. Each of these composite flavors, created by performing some operation, can be conceptualized as a different "view" on a single index. In the examples shown, combination can be done dynamically—a user can specify, and then modify the sets in which a search is to be performed, and can dynamically alter the results that he or she will be provided, without having to perform the search again. The base category scores can be used by the user to influence which results will be presented in what order.

FIG. 8A represents the union of two flavors. Suppose a user wants to purchase a book or a movie to enjoy over the weekend. The user doesn't have a preference of one form over the other, the user just wants the "best" murder mystery title in either of those mediums. One way for a user to achieve a desirable result is to query for "murder mystery" in the union of a Book category and a Movie category. The result of such a search could turn up a book, a movie, or a product such as a book that has been made into a movie.

One way to create a union of two flavors is to compute a maximum. Suppose there are only two documents (D1 and D2) in collection 102, as follows:

| | Books | Movies |
|---|---|---|
| D1 | 0.9 | 0.1 |
| D2 | 0.5 | 0.5 |

The union of the Books and Movies categories will result in document D1 having a score of 0.9, and document D2 having a score of 0.5 in the combined Books-OR-Movies flavor. This is so because in this example, the maximum value of each document's two category scores serves as the category score for the newly created category. In this example, the user is looking for high relevance to at least one of the categories, not universal or mediocre relevance across all categories. Accordingly, document D1 is potentially a much better result for the user than D2 in this scenario.

FIG. 8B represents the intersection of two flavors. Suppose the user now desires to find a book that has been made into a movie, or vice versa. He or she could query for "murder mystery" in the intersection of the Book category and Movie category.

One way to create an intersection of two flavors is to compute a product. Using the same numerical example:

|    | Books | Movies |
|----|-------|--------|
| D1 | 0.9   | 0.1    |
| D2 | 0.5   | 0.5    |

The scores indicate that document D1 is very relevant to books, and not at all relevant to movies. Document D2 is equally relevant to both books and movies. The product of D1's category scores in Books and Movies is 0.09. In contrast, the product of D2's category scores in Books and Movies 0.25. Thus, document D2 is a much "better" document in the Books-AND-Movies flavor.

Virtual groups can also be used to improve performance. For example, suppose that there exist base categories for Health and for Women. A user can perform a Women's Health related search (without the need for an additional seed set) by applying an intersection of the two base categories to the user's results.

FIG. 8C represents the exclusion of a flavor. Suppose murder mystery books that are subsequently made into movies often have their endings spoiled due to widespread discussion of the movie in the press. If the user desires to find an unspoiled book, the user may want to see results for "murder mystery" that are relevant to books, but not to movies—a good indicator that any book found as a result to this query will not have been made into a movie.

One way to exclude a flavor is to use subtraction.
Using the same numerical example:

|    | Books | Movies |
|----|-------|--------|
| D1 | 0.9   | 0.1    |
| D2 | 0.5   | 0.5    |

For each document, subtract the score of the category to be excluded from the score of the category to be included. In this example, D1 will have a score of 0.8 in the "Movies Excluded" flavor. D2 will have a score of 0.0 in the "Movies Excluded" flavor. Other techniques may be used to manipulate categories as appropriate. For example, in some embodiments, exclusion is performed by subtracting the score from 1 and then taking a union of the results.

Double Iterative Flavored Rank

Figure 9:
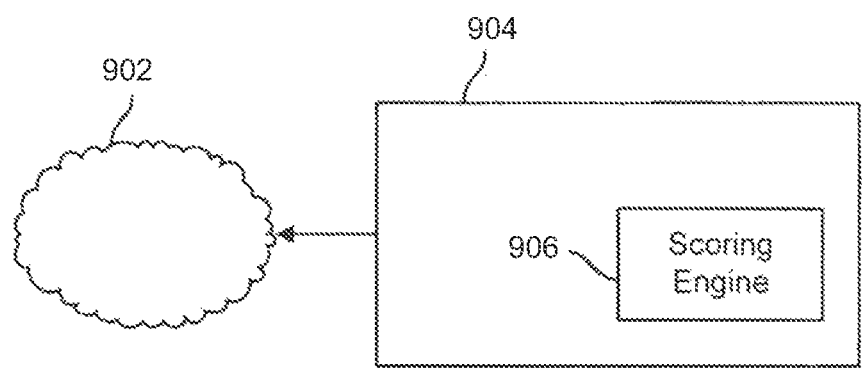
FIG. 9 illustrates an embodiment of a scoring engine.

FIG. 9 illustrates an embodiment of a scoring engine. In the example shown, collection 902 is a group of World Wide Web pages, and is crawled and indexed by a search system 904.

Each document in collection 902 can be thought of as serving two functions: that of a source, and that of a destination. Scoring engine 906 assigns a source score and a destination score to each document in collection 902 based in part on how good of a source and destination, respectively, that document is. In some embodiments, scoring engine 906 is not part of a search system (e.g., it is a standalone scoring system) and/or other components of search system 904 are omitted.

As described more fully below, the scores can be recursively defined in terms of each other.

These source and destination scores can be used to rank pages, for example in response to a search query, based on a variety of functions. In some cases, the source and destination scores of each page are combined into a single score using a weighted average. In some cases, the source scores are ignored and only the destination score is used. In some cases, good sources and good destinations are listed separately in the search results.

Figure 10A:
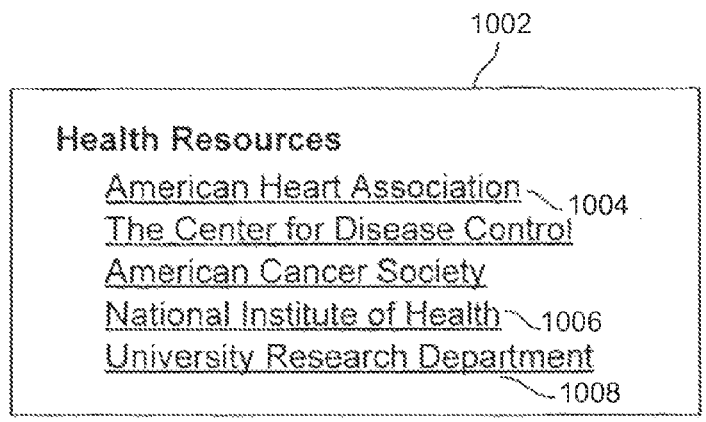
FIG. 10A illustrates an embodiment of a source.

FIG. 10A illustrates an embodiment of a source. In the example shown, a web page 1002, titled "Health Resources," contains a number of hyperlinks to websites, such as the American Heart Association (1004) and the National Institute of Health (1006).

A page can be defined as a "good" source for a topic (e.g., diabetes) if good destinations are "reachable" from it. Thus, a page is a good source for a topic if it guides a visitor in the direction of good destination pages for that topic. A good source need not (but may) contain authoritative information about a topic.

In the example shown in FIG. 10A, the American Heart Association page is reachable by web page 1002. This is so because web page 1002 contains a direct link (1004) to the American Heart Association page. Pages do not need to be directly linked to have reachability, however.

Figure 10B:
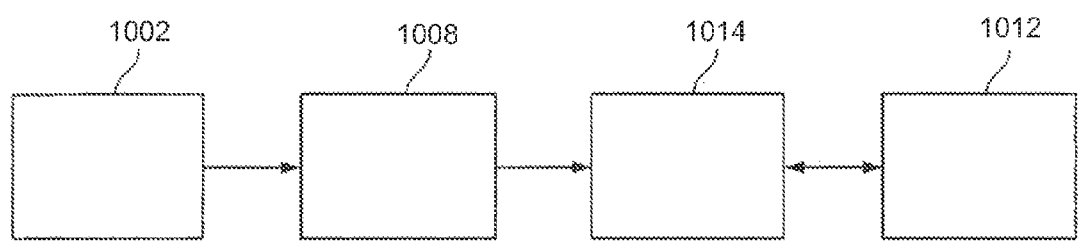
FIG. 10B illustrates an embodiment of pages having reachability.

FIG. 10B illustrates an embodiment of pages having reachability. The Health Resources page (1002) contains a link to a University Research Department page (1008). The University Research Department contains links to home pages for some of the individual researchers at the institution, such as page 1014. In the example shown, a researcher has written page 1012, a medical journal article on treating diabetes, which is linked to from the researcher's main page. Page 1012 is thus reachable from page 1002. As discussed more fully below, the reachability of a page can be conceptualized as the probability that a random surfer beginning on a first page will wind up on a second page.

Figure 10C:
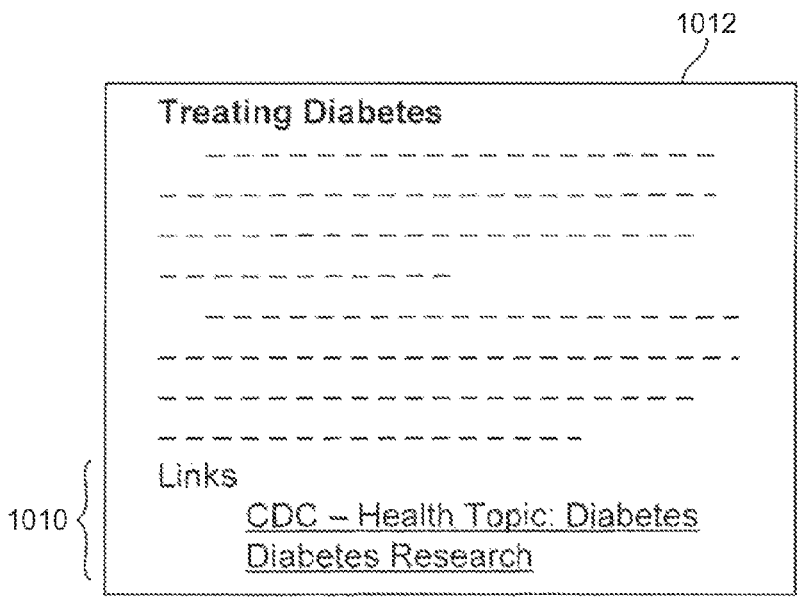
FIG. 10C illustrates an embodiment of a destination.

FIG. 10C illustrates an embodiment of a destination. In the example shown, a web page 1012, titled "Treating Diabetes," contains information about treating diabetes. A page can be defined as a "good" destination if it contains useful information about a topic and if that information is likely to be relevant to searches associated with that topic. The example shown also contains hyperlinks to other documents (1010), though such links are not necessary for a page to be a good destination. In some cases, a page may simultaneously be a good source and a good destination. This is the case, for example, with page 1012, because it presents information about the treatment of diabetes and also includes links for finding additional information about the topic.

Figure 11:
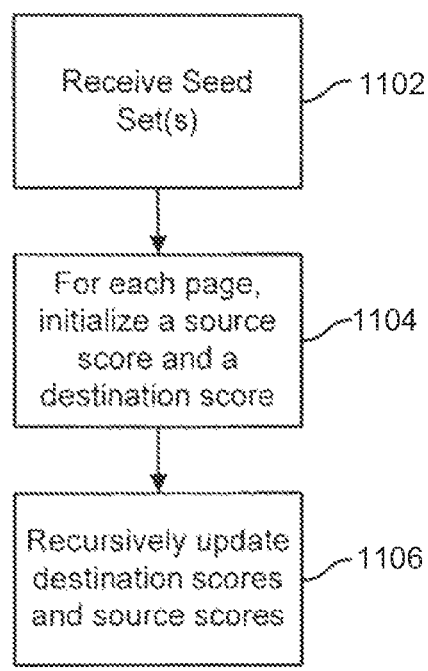
FIG. 11 illustrates an embodiment of a process for scoring documents.

FIG. 11 illustrates an embodiment of a process for scoring documents. This process may be implemented in scoring engine 906. In the example shown, the process begins at 1102 when one or more seed sets is received. The seed set can either be a seed set "S" of sources for a given topic, or a seed set "D" of destinations for a given topic. In some embodiments, both source and destination sets are received at 1102. In some embodiments, the seed sets are selected by a human and include pages that are considered to be useful or relevant to the topic. In some embodiments, the seed sets are created at least in part based on a directory service, such as by creating a set based on links in a Directory Mozilla (DMOZ) category.

The pages included in sets S and D for a topic may be dynamic. For example, as better sources for a topic are located, they may replace or join previously selected seeds in S. Likewise, better destinations—ones with more relevant information or deeper treatment of a topic—may replace or join previously selected seeds in D. As described more fully below, in some embodiments, updating the seed sets occurs automatically, as part of a process for calculating source and destination scores for documents in collection 902.

The dynamic nature of seed sets can be especially important for providing relevant results to queries in topics where authoritative pages are likely to link only to "approved" content, such as positive or flattering information about that topic. Examples include sports teams, music groups, movies, famous personalities (e.g., actors, politicians, movie directors, etc.), companies, and polarized political issues, such as abortion rights. Team websites do not routinely link to fan pages, nor are such pages even reachable from team websites despite the fact that fan pages may contain highly useful and flattering information about a team. The websites of companies such as airlines and hotels do not generally link to (or reach) companies which provide similar services, yet a user interested in travel would generally benefit in a more complete picture of his or her carrier and lodging options. Similarly, an official movie website is unlikely to link to negative reviews of the movie or boycott sites such as moviexsucks.com which can provide potentially valuable information (including rumor and innuendo) about the movie in question.

The documents in collection 902 can be represented as a directed graph. In this example, the graph has N nodes, where N corresponds to the number of documents in collection 902. The directed connections between nodes represent the links between documents. For a particular page, p, Out(p) is the set of outlinks that lead from the page to other pages. These can be represented in the directed graph as forward links of a node p. Similarly, In(p) is the set of inlinks that lead from other pages to page p. These can be represented in the directed graph as backward links of a node p.

For example, in FIG. 10B, document 1002 has one outlink. Documents 1008 and 1012 both have one inlink and one outlink. Document 1014 has two inlinks and one outlink.

At 1104, for each document in collection 902, a source score and a destination score are initialized. One method of initializing the scores is through use of the following formula:

$$s(p) = \begin{cases} \frac{N}{|S|} & \text{if } p \in S \\ 0 & \text{if } p \notin S \end{cases} \quad (1)$$

$$d(p) = \begin{cases} \frac{1}{|D|} & \text{if } p \in D \\ 0 & \text{if } p \notin D \end{cases}$$

Where:
s(p) is the source score of a page p
d(p) is the destination score of a page p
p is a document in a collection
S is a set of source seeds
D is a set of destination seeds
N is the total number of documents in the collection In this example, vectors s and d encode the source and destination scores of a particular page p in collection 902, respectively. As explained above, N is the total number of documents, such as the total number of documents in collection 902. In some cases, N may instead be the number of pages in a subset of collection 902. In this example, each source seed in S is equally weighted and each destination seed in D is equally weighted. In some embodiments, other methods may be used for initialization, such as by setting specific values for particular pages. This may be the case, for example, where particular seed destinations in D are significantly "better" than other seed destinations in D.

At 1106, the destination and source scores of the documents in collection 902 are recursively updated. In the example shown, this is accomplished through use of a random surfer model.

In a typical random surfer model (referred to herein as the unbiased model, performed by an unbiased surfer), a surfer starts at a random page on the web and begins surfing. If the surfer is currently at page p, the page q that the surfer visits at the next time step is determined in the unbiased model as follows: with probability $\beta$, the surfer picks a link uniformly at random from the set of outlinks of p, and follows it to reach a new page; with probability $1-\beta$, the surfer randomly teleports to a page picked uniformly at random from all of the pages on the World Wide Web. The value $\beta$ is typically set to 0.85.

For each page p in collection 902, the probability that the unbiased surfer visits p at the current time step converges to a value that depends only on the link structure of the web. This probability is the unbiased stationary probability of page p and is referred to herein as the "unbiased stationary probability" of page p. The vector r that lists, for each page, its unbiased stationary probability is referred to herein as the unbiased stationary probability vector r, and can be given as:

$$r = \beta A r + (1-\beta) u \quad (2)$$

Where:
r is the unbiased stationary probability vector
$\beta$ is a probability, typically set to 0.85
A is a matrix that encodes the link structure of a collection
u is a vector corresponding to uniform random teleportation If there are N pages in collection 902, u has N entries, each equal to 1/N Suppose a random surfer preferentially teleports to good sources, rather than teleporting in an unbiased fashion, such as is given above. In this case, the probability that the surfer teleports to a particular page p can be set proportional to the source score of p, s(p). Thus, the surfer teleports to each source with a probability proportional to its source score. A teleport vector for the surfer can be written as $$\frac{s}{|s|},$$

with the factor $$\frac{1}{|s|}$$

normalizing the sum of all the probabilities to 1.

In this example, the link structure of collection 902 is encoded using a matrix A. In general, if page j links to page i, then $$A_{ij} = \frac{1}{|\text{Out}(j)|},$$

and if not, $A_{ij}=0$. A vector b of stationary probabilities for this "biased" walk can be defined by the following formula:

$$b = \beta Ab + \frac{(1-\beta)}{|s|}s \quad (3)$$

Where:
b is a biased stationary probability vector
β is a probability, typically set to 0.85
A is a matrix that encodes the link structure of a collection
s is a source score vector With probability β, the surfer picks a link uniformly at random from the outlinks of p and follows it to reach a new page. With probability 1–β, the surfer teleports to a source s. In this example, every page in collection 902 has at least one outlink. In practice, some pages do not contain outlinks. In that case, such pages can be eliminated using successive sink elimination, and the stationary probability values can be modified as appropriate.

In this example, the destination score of a particular page p (denoted d(p)) is equal to b(p), the page's stationary probability in this biased walk.

Destination scores can be used to compute source scores. Suppose a random surfer has a teleport set that consists only of page p. In such a case, the teleport vector $v_p$ has 1 corresponding to p and 0 corresponding to all other pages. Here, the surfer teleports periodically to page p and continues the random walk from p. This type of walk is referred to hereinafter as a random surfer centered on p and the stationary probability $r_p$ for this random surfer can be given as:

$$r_p = \beta A r_p + (1-\beta)v_p \quad (4)$$

Where:
$r_p$ is a stationary probability vector centered on p
β is a probability, typically set to 0.85
A is a matrix that encodes the link structure of a collection
$v_p$ is a teleport vector centered on p This equation is actually a set of N equations, one for each page p in collection 902.

The source score of a particular page p can be defined in this example as $r_p(p)$, the stationary probability that the random surfer is on a good destination page (as measured by the goodness of its destination score). Conceptually, a source score is important if important destinations have received a significant portion of their destination scores from the source. One way of defining the source score is given below:

$$s(p) = \sum_{q \in N} r_p(q)d(q) \quad (5)$$

Where:
s(p) is the source score of a page p
$r_p(q)$ is a stationary probability with respect to p of q
d(q) is the destination score of a page q Here, set N is the set of all pages in collection 902, and page q is a document in collection 902. The source score of a particular page p is calculated by summing the stationary probability with respect to p of each page q multiplied by the destination score of q. To simplify notation in this example, the source score of p can be written as:

$$s(p) = r_p^T \cdot d \quad (6)$$

In some cases, a popular page q, such as www.yahoo.com, will have a high r(q), where r is the unbiased stationary probability vector, defined above in Equation 2. Because www.yahoo.com has such a high unbiased stationary probability overall, there is a high probability that it will also have a high value of $r_p(q)$. In general, a page p should not be given credit for leading to a universally popular destination, such as www.yahoo.com. One way to correct for this is to define a relative stationary probability of q with respect to p, denoted $w_p(q)$, by:

$$w_p(q) = \frac{r_p(q)}{r(q)} \quad (7)$$

Where:
$w_p(q)$ is the relative stationary probability of a page q with respect to a page p
$r_p(q)$ is a stationary probability with respect to p of q
r(q) is the unbiased probability of a page q.

The source score of p can then be written as:

$$s(p) = \sum_{q \in P} \frac{r_p(q)}{r(q)} d(q) = w_p^T \cdot d \quad (8)$$

Where:
s(p) is the source score of a page p
$r_p(q)$ is a stationary probability with respect to p of q
r(q) is the unbiased probability of a page q
d(q) is the destination score of a page q
P is a collection of pages The above definitions of source and destination score allow the source and destination scores to diffuse away from the original seed set. Without correction, the diffusion can quickly lead to topic drift and topic generalization. Topic drift occurs when the set of sources gets "contaminated" by pages that are not relevant to the topic at hand. A related problem is topic generalization. For example, suppose a ranking for the topic "marathon running" is constructed. Many pages on running and other outdoor activities are likely to link to sites about marathons. Such sites will likely receive high source scores, thereby recursively enlarging the destination sites. The result is that the ranking may be for the broader topic of "running" rather than the desired topic of "marathon running."

Two parameters, ρ and ϕ can be chosen that control how much weight to assign new sources and destinations, as opposed to those in the original seed sets. The parameter ρ is known as the destination expansion factor and the parameter ϕ is known as the source expansion factor. These factors allow some of the probability contained with the seed sets to spread out into documents in collection 902 that were not originally seeds, while retaining a portion of the probability within the seed sets. Thus, the parameters allow for the control of how much a final source or destination score of a page p will depend on the original seed sets.

Here, $0 \leq \rho \leq 1$ and $0 \leq \phi \leq 1$. Using these parameters, the destination score and source score equations can be written, respectively, as:

$$d(p) = \begin{cases} \frac{\rho}{|D|} + (1-\rho)b(p) & \text{if } p \in D \\ (1-\rho)b(p) & \text{if } p \notin D \end{cases} \quad (9)$$

$$s(p) = \begin{cases} \frac{N\phi}{|S|} + (1-\phi)w_p^T \cdot d & \text{if } p \in S \\ (1-\phi)w_p^T \cdot d & \text{if } p \notin S \end{cases} \quad (10)$$

Where:
d(p) is the destination score of a page p
s(p) is the source score of a page p
ρ is a value between 0 and 1, inclusive (0≤ρ≤1)
φ is a value between 0 and 1, inclusive (0≤φ≤1)
p is a document in a collection
S is a set of source seeds
D is a set of destination seeds In this example, ρ and φ are the percentage of the scores remain within their respective, original, sets, and 1−ρ and 1−φ are the percentage of the scores may drift out. There are a few special cases that can occur depending on how the ρ and φ values are selected. If ρ and φ are both set to 1, the source and destination scores will be held constant at their initial values. If ρ and φ are both set to 0, unbiased source and destination scores result. If ρ is set to 1 and φ is set to 0, the destination set will be fixed and only the source scores will vary. If ρ is set to 0 and φ is set to 1, the source scores will be constant and only the destination scores will vary.

The equations presented in conjunction with portion 1106 of FIG. 11 are given in part to help conceptualize a process for computing source and destination scores. While the equations presented can be used to compute source and destination scores, to do so would require, for each page p, a very large number of computations, especially when collection 902 is large. As described more fully below, in some embodiments, more efficient processes are employed to iteratively calculate source and destination scores, such as are described in conjunction with FIGS. 5 and 6.

A simplified numeric example of an iterative version of the process shown in FIGS. 11 and 5 is given in FIGS. 12A-12E to help illustrate the process conceptually.

Figure 12A:
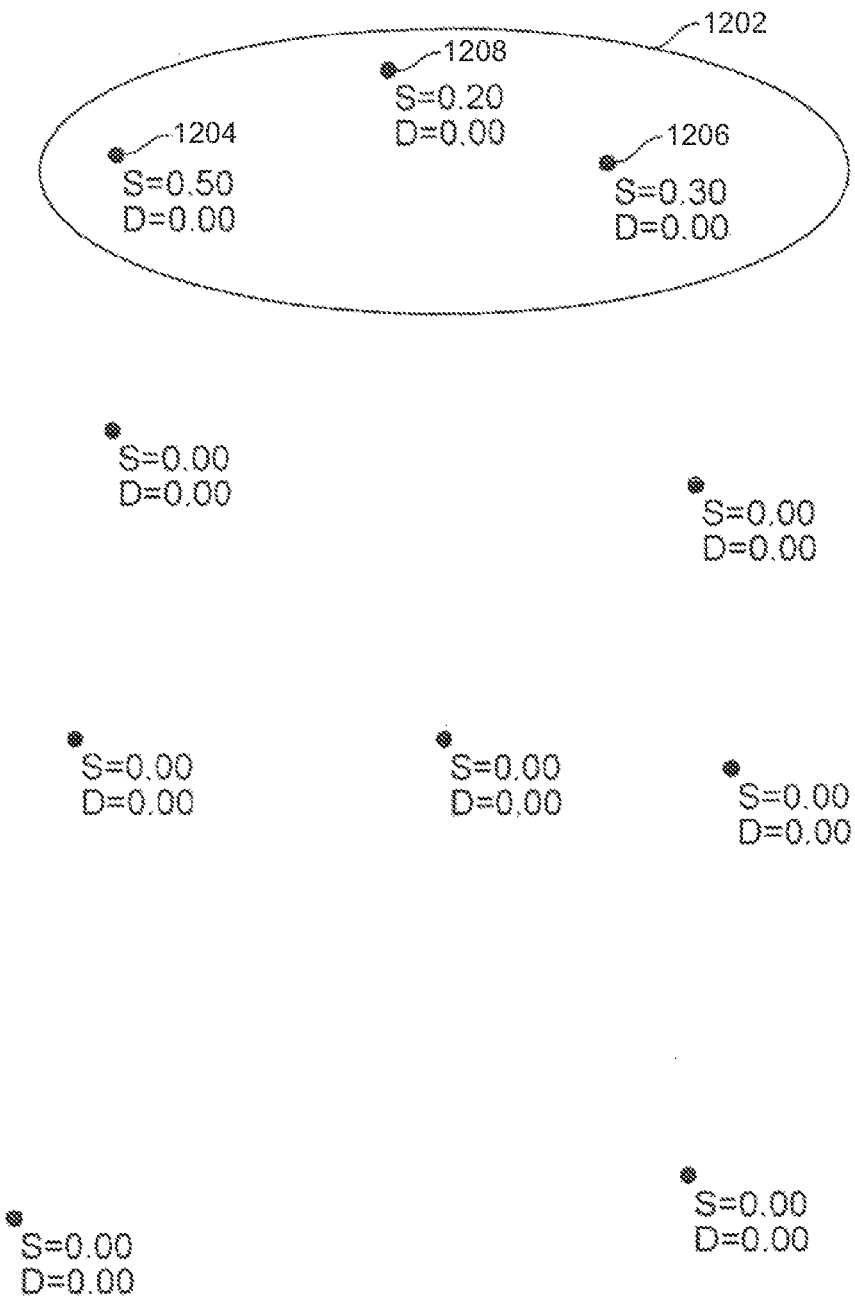
FIG. 12A illustrates a simplified embodiment of a portion of a process for assigning scores to a collection of documents based on a source set.

FIG. 12A illustrates a simplified embodiment of a portion of a process for assigning scores to a collection of documents based on a source set. The process depicted in FIG. 12A could be an example of an implementation of portions 1102 of FIGS. 11 and 1304 of FIG. 13 as applied to collection 902. The example shown uses a simplified numerical method for calculating destination scores (d(q)) that are reached during a series of random walks beginning at each node p in the seed set. In the example shown, each node q that is visited during a random walk originating at p is assigned a score given by d(q)=s(p)−0.1(i²), where i is the distance from the particular source seed p, and s(p) is the source score of that p. Here, distance is defined as the number of hops q is away from p. In this example, if a particular q is visited by multiple ps, the resulting destination scores are summed. If a computed value of a d(q) is negative, in this example, it is set to 0.

For simplicity of illustration, the values given in FIGS. 12A-12E are not normalized to maintain a unity, and are significantly larger than they would likely be in practice, where millions of documents may be included in collection 902.

In the example shown, nodes 1204, 1206, and 1208 are included in a source seed set 1202. Their source seed values are 0.5, 0.3, and 7.0, respectively. Their destination scores are each 0. The other nodes in collection 902 have their source and destination scores initialized to 0.

Figure 12B:
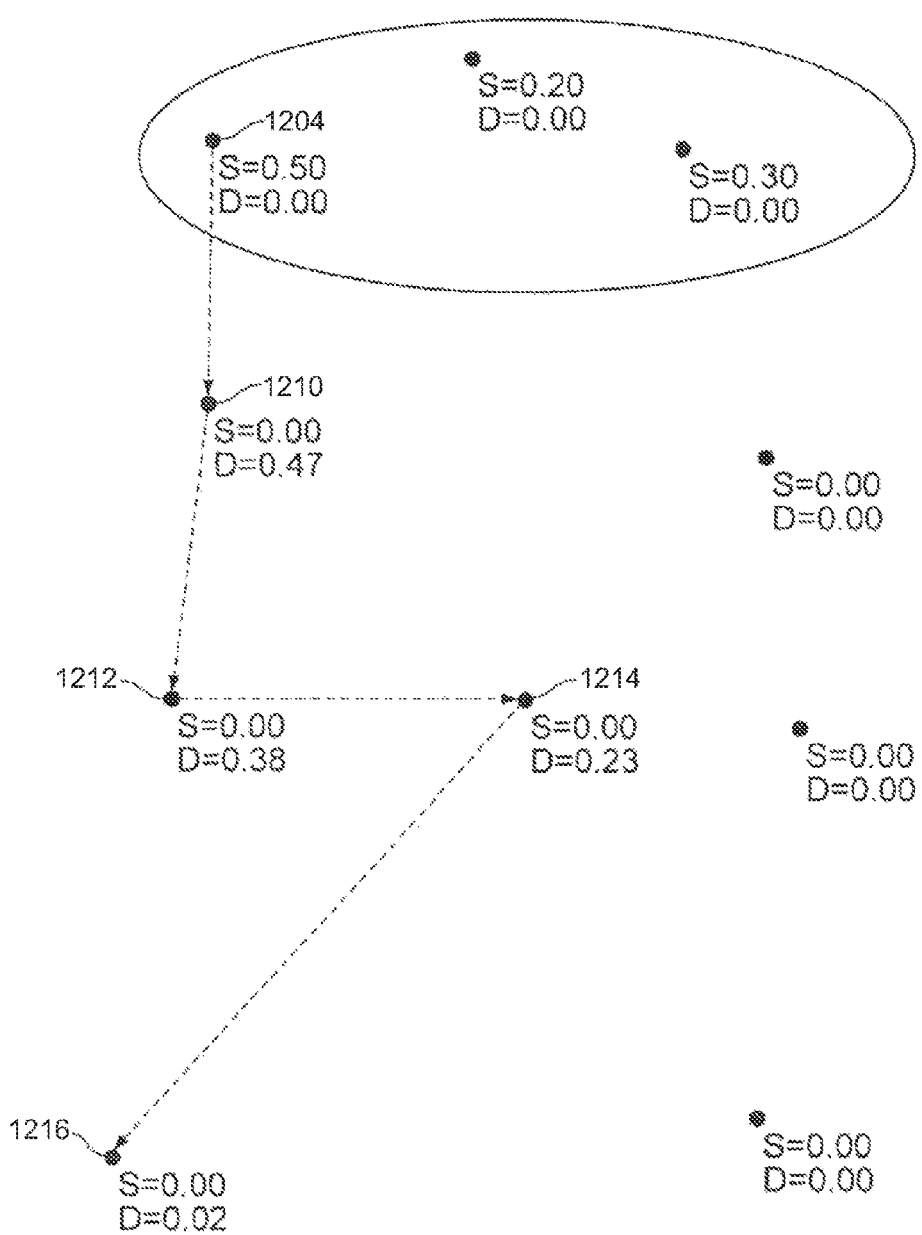
FIG. 12B illustrates a simplified embodiment of a portion of a process for assigning scores to a collection of documents based on a source set.

FIG. 12B illustrates a simplified embodiment of a portion of a process for assigning scores to a collection of documents based on a source set. The process depicted in FIG. 12B could be an example of an implementation of 1106 of FIGS. 11 and 1306 of FIG. 13. A random walk beginning at node 1204 is performed. The first page reached from node 1204 is node 1210. Node 1210 thus receives as its destination score a portion of node 1204's source score. In this case, the received score is 0.47. The second page reached from node 1204 is node 1212. Node 1212 receives a destination score of 0.38. The third page reached from node 1204 is node 1214. Node 1214 receives a destination score of 0.23. The final page reached from node 1204 is node 1216. Node 1216 receives a destination score of 0.02. After traversing to node 1216, the random walk teleports.

Figure 12C:
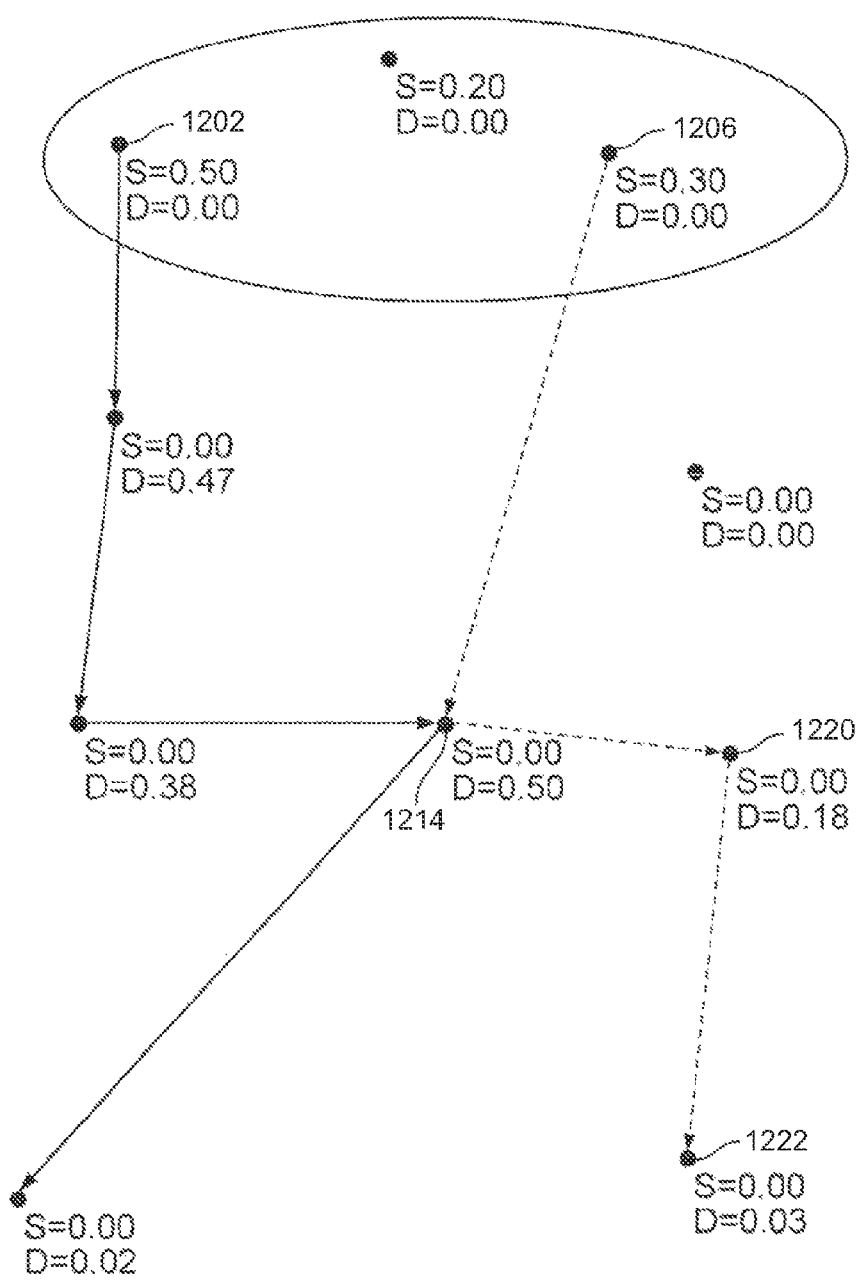
FIG. 12C illustrates a simplified embodiment of a portion of a process for assigning scores to a collection of documents based on a source set.

FIG. 12C illustrates a simplified embodiment of a portion of a process for assigning scores to a collection of documents based on a source set. A random walk beginning at node 1206 is performed. The first page reached from node 1206 is node 1214. In this example, node 1214 was already reached from node 1202 as illustrated in FIG. 12B. As a result, the portion of node 1206's source score (in this case, 0.27) is added to the portion of node 1204's score (as shown in FIG. 12B, 0.23), for a total destination score of 0.50. The second page reached from node 1206 is node 1220. Node 1220 receives a destination score of 0.18. The final page reached from node 1206 before teleport is node 1222. Node 1222 receives a destination score of 0.03.

Figure 12D:
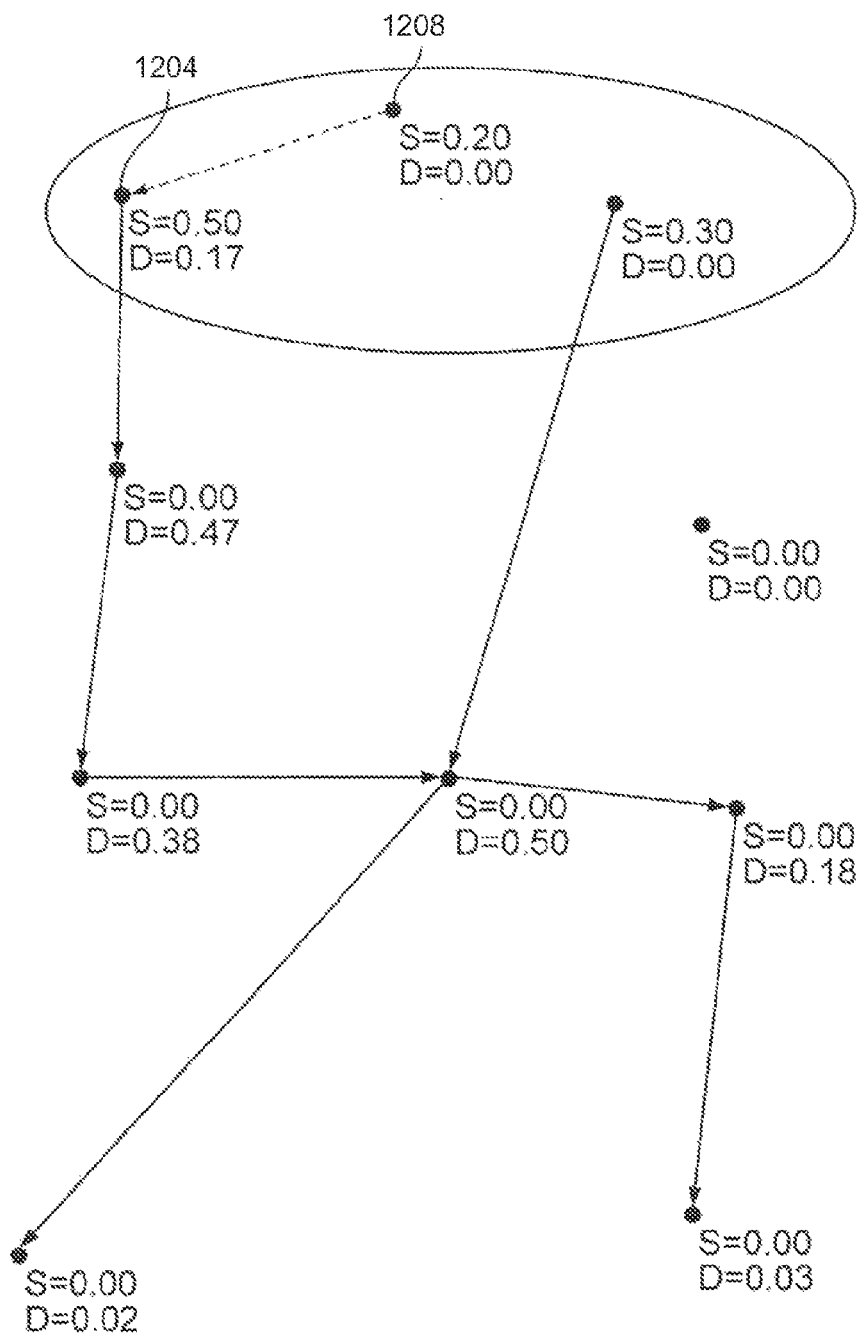
FIG. 12D illustrates a simplified embodiment of a portion of a process for assigning scores to a collection of documents based on a source set.

FIG. 12D illustrates a simplified embodiment of a portion of a process for assigning scores to a collection of documents based on a source set. A random walk beginning at 1208 is performed. In this case, the first page reached from node 1208 is another source seed node, node 1204. Node 1204 receives a destination score of 0.17. At this stage in the example, a random walk starting at each node in the seed set has been made.

Figure 12E:
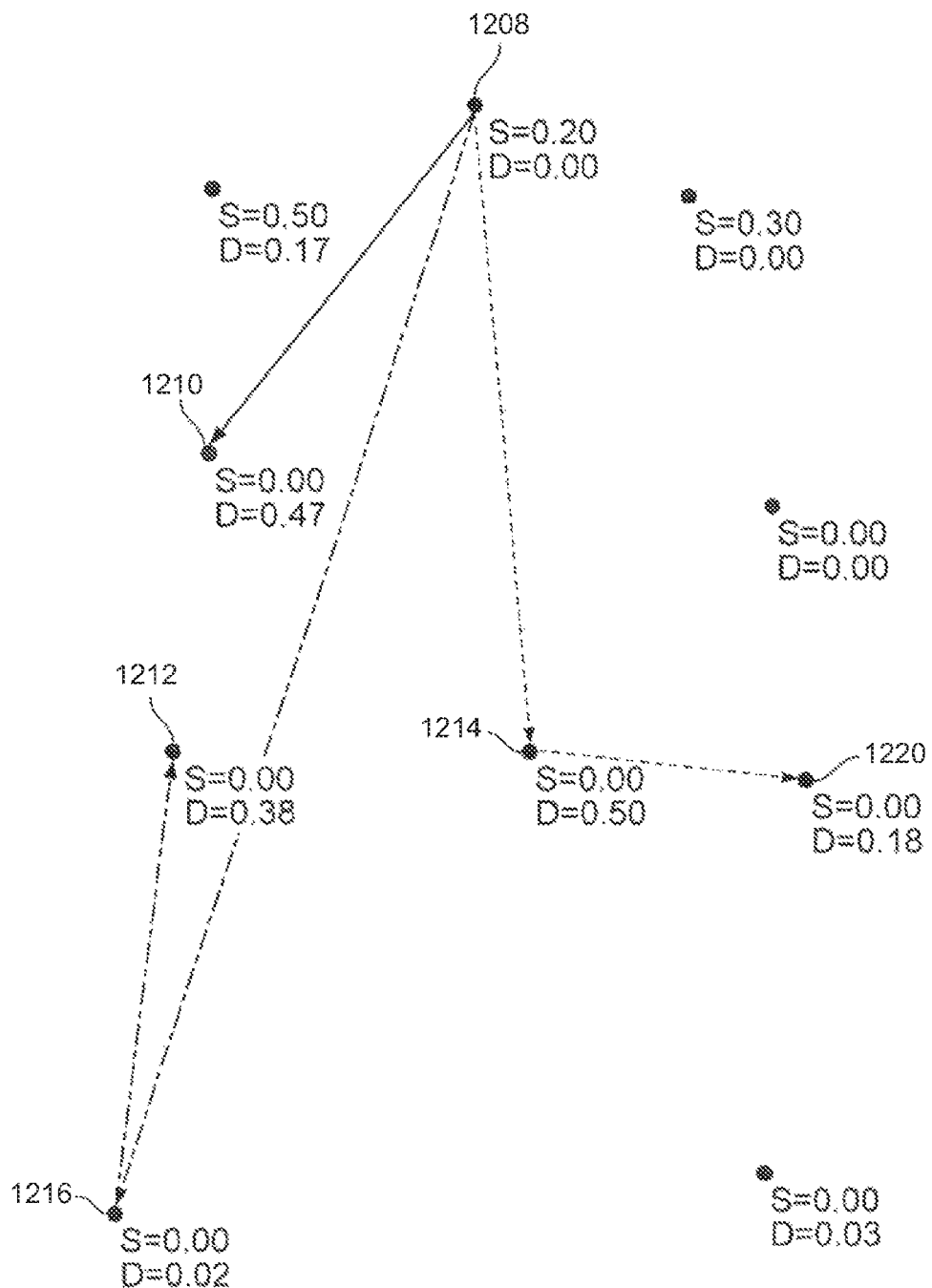
FIG. 12E illustrates a simplified embodiment of a portion of a process for assigning scores to a collection of documents based on a source set.

FIG. 12E illustrates a simplified embodiment of a portion of a process for assigning scores to a collection of documents based on a source set. The process depicted in FIG. 12E could be an example of an implementation of 1106 of FIGS. 11 and 1308 of FIG. 13 as applied to collection 902. A source score for a page p can be calculated by determining the percentage of destination score that a page q has received from p and multiplying that by the destination score. The process is repeated for each q, and the results are summed. In the example shown, nodes 1210, 1214, 1220, 1216, and 1212 have each received some portion of destination score from node 1208. The source score of node 1208 could thus be calculated as the percentage of destination score that node 1210 received from node 1208 multiplied by 0.47, summed with the amount of percentage of destination score that node 1216 received from node 1208 multiplied by 0.02, and so on.

Once source scores have been computed for each node in collection 902, a new seed set can be constructed. In some embodiments, all nodes with non-zero source scores are used to form the updated set S. In some embodiments, a threshold is applied. In that case, nodes not previously in S may be added to S if their source scores are large enough. In some embodiments, nodes previously in S whose source scores have decreased may be demoted out of set S. Once a new seed set has been constructed, the process can begin again, and additional computations, such as the additional iterations 1308 and 1310 of FIG. 13 can be performed.

Figure 13:
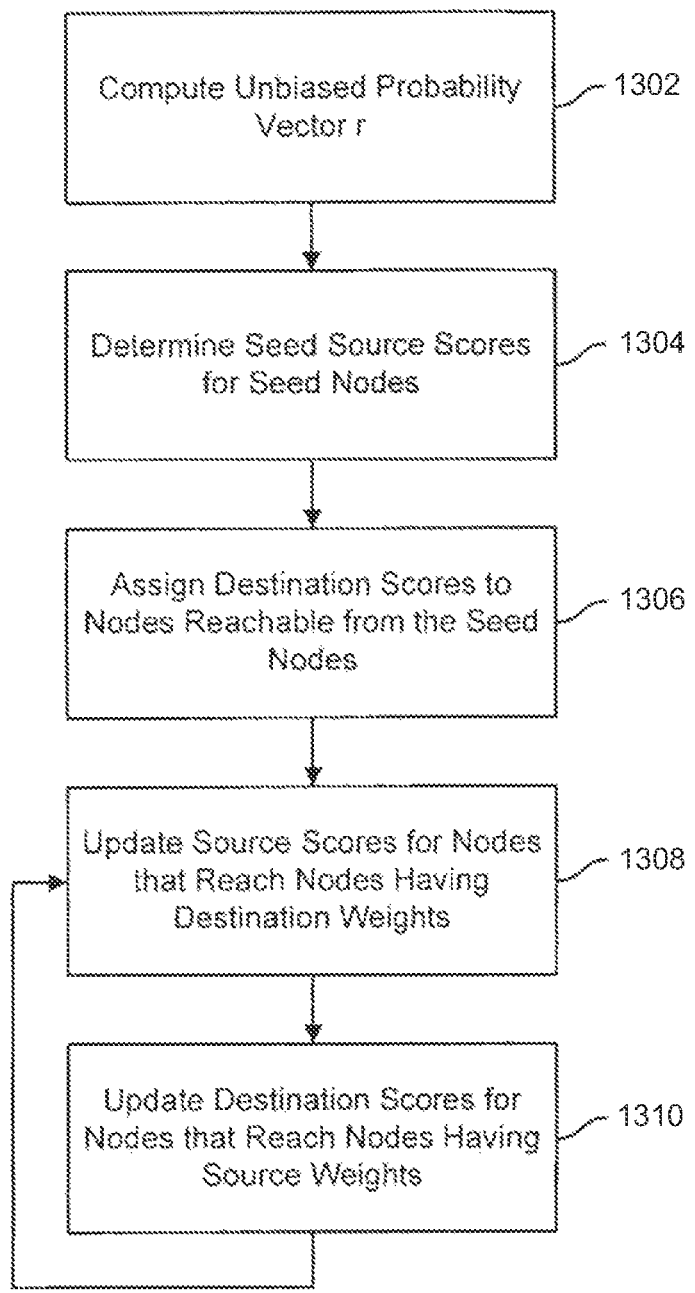
FIG. 13 illustrates an embodiment of a process for assigning scores to a collection of documents based on a source set.

FIG. 13 illustrates an embodiment of a process for assigning scores to a collection of documents based on a source set. In the example shown, the random surfer is modeled through an iterative process. The process begins at 1302 when an unbiased stationary probability vector r is computed, such as through use of the formula given in Equation 2. At 1304, each seed node in the source set is assigned a source seed score.

The source and destination scores of the pages in collection 902 are optionally initialized, such as through use of the procedure discussed in conjunction with 1104 of FIG. 11. In this example, the destination vector d is initialized to pd and the source vector s is initialized to φs. Vectors b and z are initialized to 0.

At 1306, destination scores are assigned to nodes reachable from the source seeds. One method for calculating destination scores is as follows:

$$b(p) = \beta \sum_{q \in In(p)} \frac{b(q)}{|Out(q)|} + \frac{(1-\beta)}{N} s(p) \quad (11)$$

$$d(p) = \rho d(p) + (1-\rho) b(p)$$

Where:
d(p) is the destination score of a page p
β is a probability, typically set to 0.85
In(p) is the set of inlinks of a page p
Out(q) is the set of outlinks of a page q
N is the total number of documents in the collection
ρ is a value between 0 and 1, inclusive (0≤ρ≤1)
φ is a value between 0 and 1, inclusive (0≤φ≤1)

In other examples other formulas are used to calculate the destination score. Other appropriate pairs of equations that define source and destination scores in terms of each other may be used. For example, in the embodiment depicted in FIG. 13, all links are treated equally. In some embodiments, link weights (e.g., weights assigned based on anchor text) are used to bias the computation of source and/or destination scores. At 1308, nodes that reach nodes that have nonzero destination scores are assigned source scores. One method for calculating source scores is as follows:

$$z(p) = \frac{\beta}{|Out(p)|} \sum_{q \in Out(p)} z(q) + (1-\beta)\frac{d(p)}{r(p)} \quad (12)$$

$$s(p) = \phi s(p) + (1-\phi) z(p)$$

Where:
s(p) is the source score of a page p
d(p) is the destination score of a page p
r(p) is the unbiased stationary probability of a page p
β is a probability, typically set to 0.85
Out(p) is the set of outlinks of a page p
ρ is a value between 0 and 1, inclusive (0≤ρ≤1)
φ is a value between 0 and 1, inclusive (0≤φ≤1)

In other examples other formulas are used to calculate the source score, as appropriate.

At 1310, nodes reachable from nodes having nonzero source scores are assigned destination scores. As used herein, "evaluation" nodes are nodes which have nonzero source scores, used to evaluate the destination score of a particular web node, or nodes which have nonzero destination scores, used to evaluate the source score of a particular web node. In some cases, evaluation nodes may be used for both purposes. In some embodiments, the process iterates through 1308 and 1310 until convergence. In some cases, such as where collection 902 is large, only a small number of iterations may be needed to achieve useful source and destination scores. In such cases, the process may be terminated before convergence.

Figure 14:
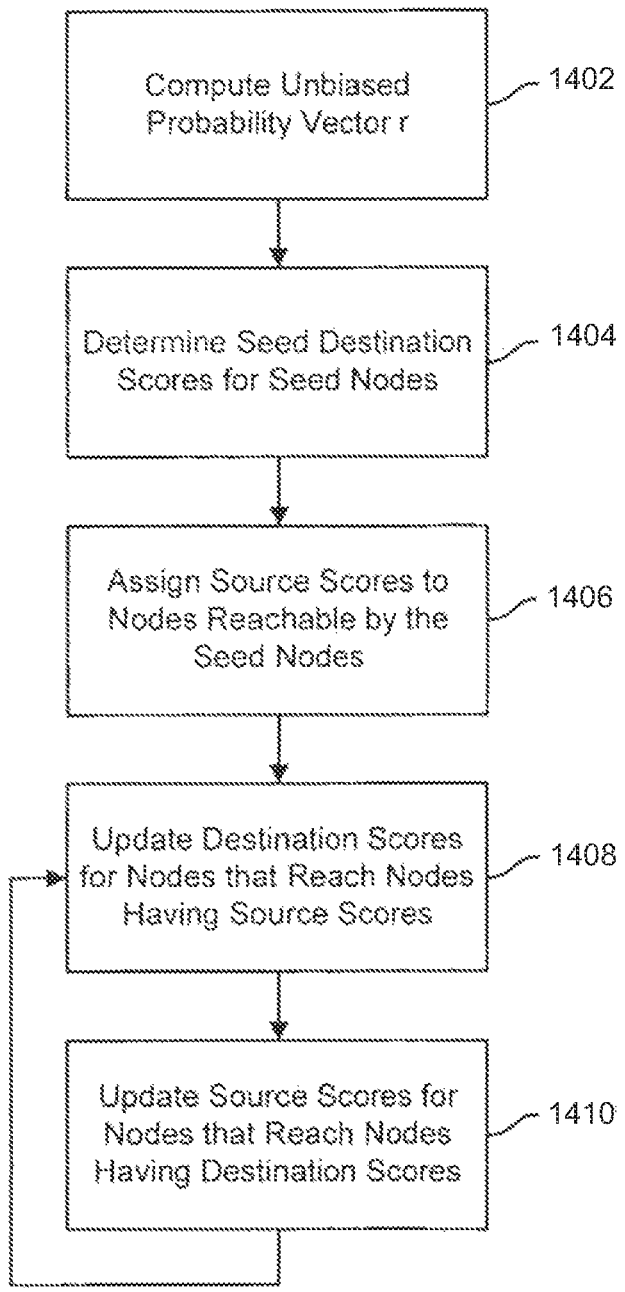
FIG. 14 illustrates an embodiment of a process for assigning scores based on a destination set.

FIG. 14 illustrates an embodiment of a process for assigning scores based on a destination set. The example shown can be used in cases where no known sources for a particular topic exist and the source seed set is empty. In that case, if a good destination or set of destinations is known, the destination set can be used to find a source set. For example, for a particular health topic, such as a rare blood disease, no source seed set may be known. It may nonetheless be known that particular sites are good destinations about the topic. A destination set can be used as appropriate to seed the process.

The process begins at 1402 when an unbiased probability vector r is computed, such as through use of the formula given in Equation 2. At 1404, each seed node in the destination set is assigned a seed destination score. The source and destination scores of the pages in collection 902 are optionally initialized, such as through use of the procedure discussed in conjunction with 1104 of FIG. 11. In this example, the destination vector d is initialized to pd and the source vector s is initialized to φs. Vectors b and z are initialized to 0.

At 1406, nodes that reach the destination seeds are assigned source scores as applicable. At 1408, nodes that are reached by nodes that have nonzero source scores are assigned destination scores as applicable. At 1410, nodes that reach destinations having nonzero destination scores are assigned source scores as applicable. In some embodiments, the process iterates through 1408 and 1410 until convergence. In some cases, such as where collection 902 is large, only a small number of iterations may be needed to achieve useful source and destination scores. In such cases, the process can be terminated before convergence.

Topic Relevance

Figure 15:
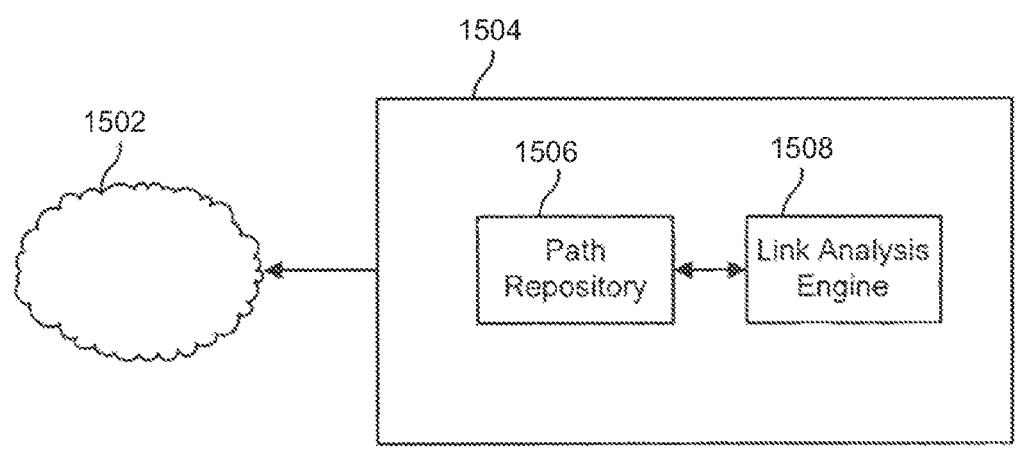
FIG. 15 illustrates an embodiment of a link analysis engine.

FIG. 15 illustrates an embodiment of a link analysis engine. In the example shown, collection 1502 is a group of World Wide Web pages, and is crawled and indexed by a search system 1504.

At least some of the documents in collection 1502 include links to other documents in collection 1502. As described in more detail below, the documents in collection 1502 can be represented as a directed graph (hereinafter the "web graph"). In this example, the graph has N nodes, where N corresponds to the number of documents in collection 1502. The directed connections between nodes represent the links between documents. For a particular page p, Out(p) is the set of outlinks that lead from the page to other pages. These can be represented in the directed graph as forward links of a node p. Similarly, In(p) is the set of inlinks that lead from other pages to page p. These can be represented in the directed graph as the backward links of a node p.

Path repository 1506 contains information associated with the links between the documents in collection 1502. For example, in some embodiments, path repository 1506 contains a table detailing the inlinks and outlinks of each page in repository 1502. In some embodiments, other methods are used to encode linking information.

Link analysis engine 1508 is used to analyze link information such as is provided by path repository 1506. The information can be used, for example, to determine the relevance of a document to one or more topics (which can be defined, e.g., by another document, or a group of documents, such as a seed set). The information can also be used to assign one or more scores to documents. In some cases, multiple scores are combined into a single score such as by using a weighted average. The scores can be used to rank pages, for example, in response to a search query, based on a variety of functions.

In some embodiments, the information in path repository 1506 includes information supplied, such as by a third party, rather than extracted from collection 1502 by a search system 1504. In some embodiments, path repository 1506 and link analysis engine 1508 are not part of a search system (e.g., they form a link analysis system) and/or other components of search system 1504 are omitted.

Figure 16:
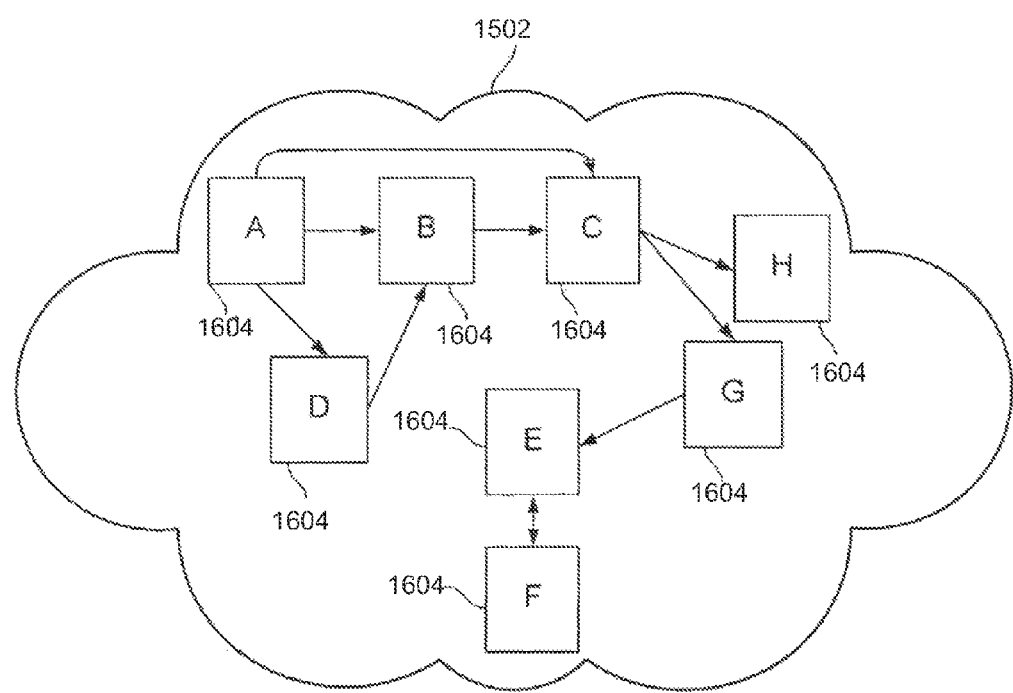
FIG. 16 illustrates sample documents in a collection having link structure.

FIG. 16 illustrates sample documents in a collection having link structure. In the example shown, a collection, such as collection 1502 includes several documents 1604. Here, page A has three outlinks—they lead to pages B, D, and C. The direction of the link is indicated here with an arrow head. Page B has two inlinks (from pages A and D) and one outlink (to page C). Pages E and F link to each other. Thus, page E has two inlinks (page G and page F) and one outlink (page F), while page F has one inlink and one outlink (page E in both cases).

Page B is "reachable" from page A in this case because there is a direct link leading from page A to page B. In addition to direct links, however, a page can also be reachable from pages that are not directly linked. In this example, page C is reachable from page D because a person visiting page D could follow an outlink from page D to page B, and then follow another outlink from page B to page C. As discussed more fully below, the reachability of a page can be conceptualized as the probability that a random surfer beginning on a first page will wind up on a second page.

Figure 17A:
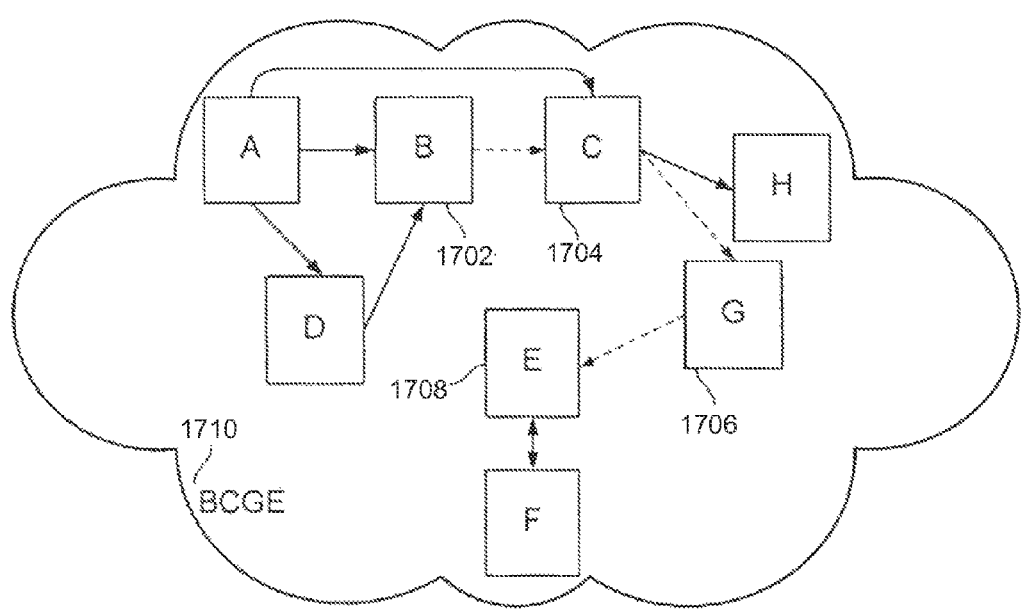
FIG. 17A is an example of a natural random walk.

FIG. 17A is an example of a natural random walk. In a typical random surfer model (also referred to herein as the unbiased model/random walk, performed by an unbiased surfer), a surfer starts at a random page on the web and begins surfing. If the surfer is currently at page p, the page q that the surfer visits at the next time step is determined in the unbiased model as follows: with probability $\beta$, the surfer picks a link uniformly at random from the set of outlinks of p, and follows it to reach a new page; with probability $1-\beta$, the surfer randomly teleports to a page picked uniformly at random from all of the pages on the World Wide Web. The value $\beta$ is typically set to 0.85. The walks that the random surfer performs are referred to herein as "paths." In this example, the generated path indicates that documents could be accessed by following the walk. The walk itself is typically simulated, such as by one or more methods of approximating or modeling the behavior of a random surfer, rather than performing an actual random walk.

For each page p in collection 1502, the probability that the unbiased surfer visits p at the current time step converges to a value that depends only on the link structure of the web. This probability is the stationary probability of page p and is referred to herein as the "Page Rank" of page p. The vector r that lists, for each page, its Page Rank is referred to herein as the Page Rank vector r, and can be given as:

$$r = \beta A r + (1-\beta) u \quad (13)$$

Where:
r is the Page Rank vector
$\beta$ is a probability, typically set to 0.85
A is a matrix that encodes the link structure of a collection
u is a vector corresponding to uniform random teleportation If there are N pages in collection 1502, u has N entries, each equal to 1/N.

A random walk R is composed of many "natural random walks" created by breaking the random walk, R, at each teleportation step. Consider the following random walk, R, made up of assorted web pages (denoted by $W_x$, where x is a number between 1 and N, inclusive) and teleports (denoted T):

$$R = W_1 W_8 W_3 T W_{12} W_2 W_3 W_{11} W_{20} W_{31} T \ldots$$

The natural random walks in R are as follows:

$$R_1 = W_1 W_8 W_3$$

$$R_2 = W_{12} W_2 W_3 W_{11} W_{20} W_{31}$$

. . .

In the example shown in FIG. 17A, a natural random walk (denoted by a dashed line) began at page B (1702), continued to page C (1704), then continued to page G (1706), then continued to page E (1708) before teleporting. Thus, in the example shown in FIG. 17A, the natural random walk was of length 4, notated as path BCGE (1710).

Figure 17B:
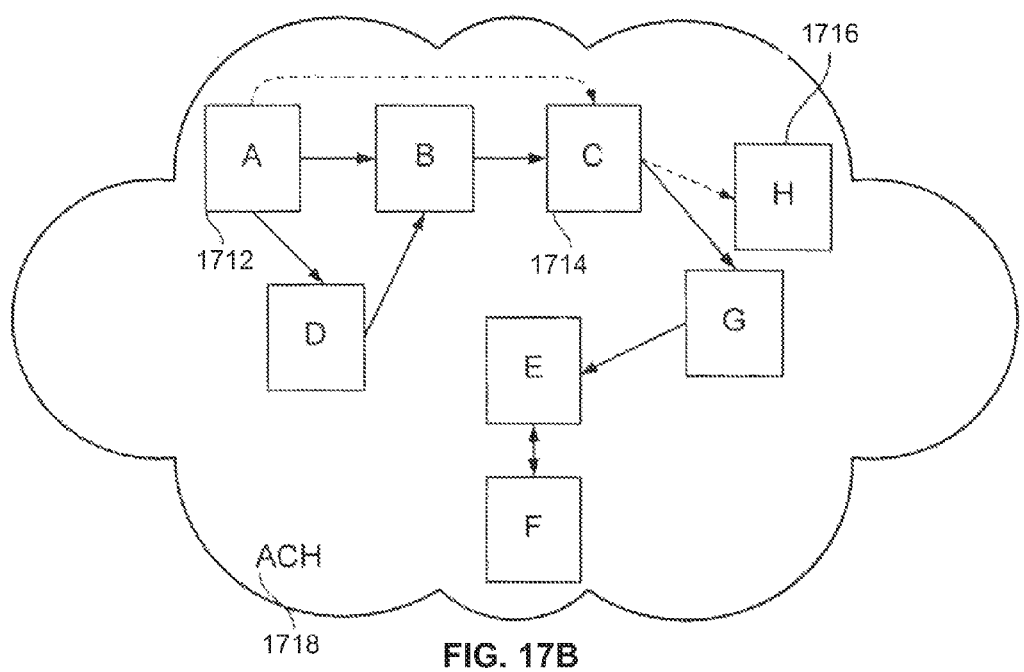
FIG. 17B is an example of a natural random walk.

FIG. 17B is an example of a natural random walk. After teleporting from page E (1708), a new random walk was begun on page A (1712). The walk continued from page A to page C (1714), and then continued to page H (1716) before teleporting. Thus, in the example shown in FIG. 17B, the random walk was of length 3, notated as path ACH (1718).

Market Basket Analysis

As described in more detail below, topic score and topic relevance measure different properties of a page in a topic—popularity and relevance.

The natural random walk framework can be viewed in the context of data mining, in particular market basket analysis. A traditional problem in data mining is determining "association rules" given market baskets.

Assume there is a list of contents of every grocery cart (market basket) that was checked out at a grocery store. This data can be mined to see how some products should be placed in the store. For example, if every purchase of diapers is also accompanied by a purchase of beer, i.e., Diapers→Beer, it may be profitable to locate the beer near the diapers.

Two metrics used in data mining are the confidence (i.e., what is the probability that X→Y) and the support (i.e., how many times do X and Y appear together in the market baskets).

Support can be used to prevent the making of decisions based on very sparse data. For example, if exactly one person purchased vodka, and they bought it with diapers, Vodka→Diapers with confidence 1. However, the support would be very low.

Natural random walks can be seen as market baskets. The topic relevance of a page X in topic F is the Confidence that X→F. The topic score of X is the support. Thus, topic score and topic relevance are fundamentally different metrics. One way to employ both scores is to use support as a threshold and confidence as a final score. In other embodiments, other combinations of the functions are used.

A "distinguished" page is used herein to mean a page that is of interest in determining the relevance of one or more pages to a topic. For example, a highly informative site may be used to define a topic (e.g., medline.com for health, or imdb.com for movies.) As described in more detail below, in some cases, the distinguished page is a member of a group of pages that define a topic. For example, the distinguished page may be part of a seed set of pages, such as the seed sets used in the DIFR process described above.

Figure 18A:
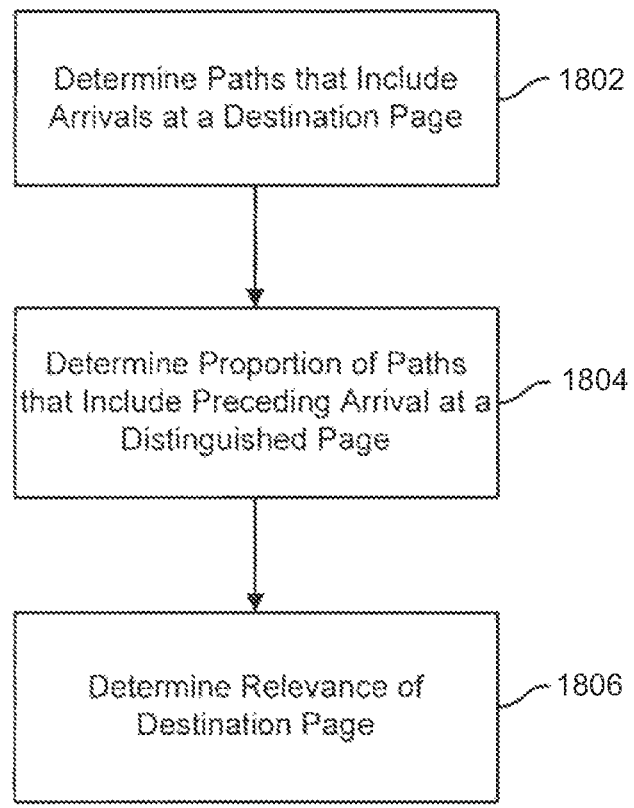
FIG. 18A illustrates an embodiment of a process for determining the relevance of a document.

FIG. 18A illustrates an embodiment of a process for determining the relevance of a document. In this example, the relevance of a destination page to a distinguished node is determined. As described in more detail below, other methods may be used to determine the relevance of one document to multiple documents, and/or to combinations of documents.

This process may be implemented in link analysis engine 1508. In the example shown, the process begins at 1802 when paths that include arrivals at a destination page are determined. A simplified numeric example of an iterative method for determining such paths is given in FIGS. 19A-19D to help illustrate the process conceptually. As described in more detail below, in some embodiments, more efficient processes are employed to implement and/or model the determination of paths.

At 1804, the proportion of paths that include visiting the distinguished page before reaching the destination page is determined. For example, in FIG. 16, if page B is a distinguished node, and page G is a destination node, all paths that lead through page G (e.g., CGE, BCG, GE, ACGE) would be included in the processing at 1802. Only the paths in which page B was visited before page G would be included in determining the proportion at 1804. For example, ABCG and ADBCG visit page G after visiting page B, while CGE does not.

At 1806, the relevance of the destination page is determined. As described in more detail below, various methods of determining the relevance of a destination page may be employed. For example, the relevance of a page to a group of pages may be determined. In some embodiments, relevance is determined by combining multiple values, such as a DIFR score and/or score deta reverse relevance score.

In some embodiments, portions 1804 and 1806 of FIG. 18A are combined—the relevance of a destination page to a distinguished node is determined by assigning a score based on dividing the number of paths that include preceding arrival at a distinguished page by the total number of paths the include arrivals at the destination page. This is the case, for example, in the process depicted in FIGS. 19A-19D and is referred to as a topic score.

Figure 18B:
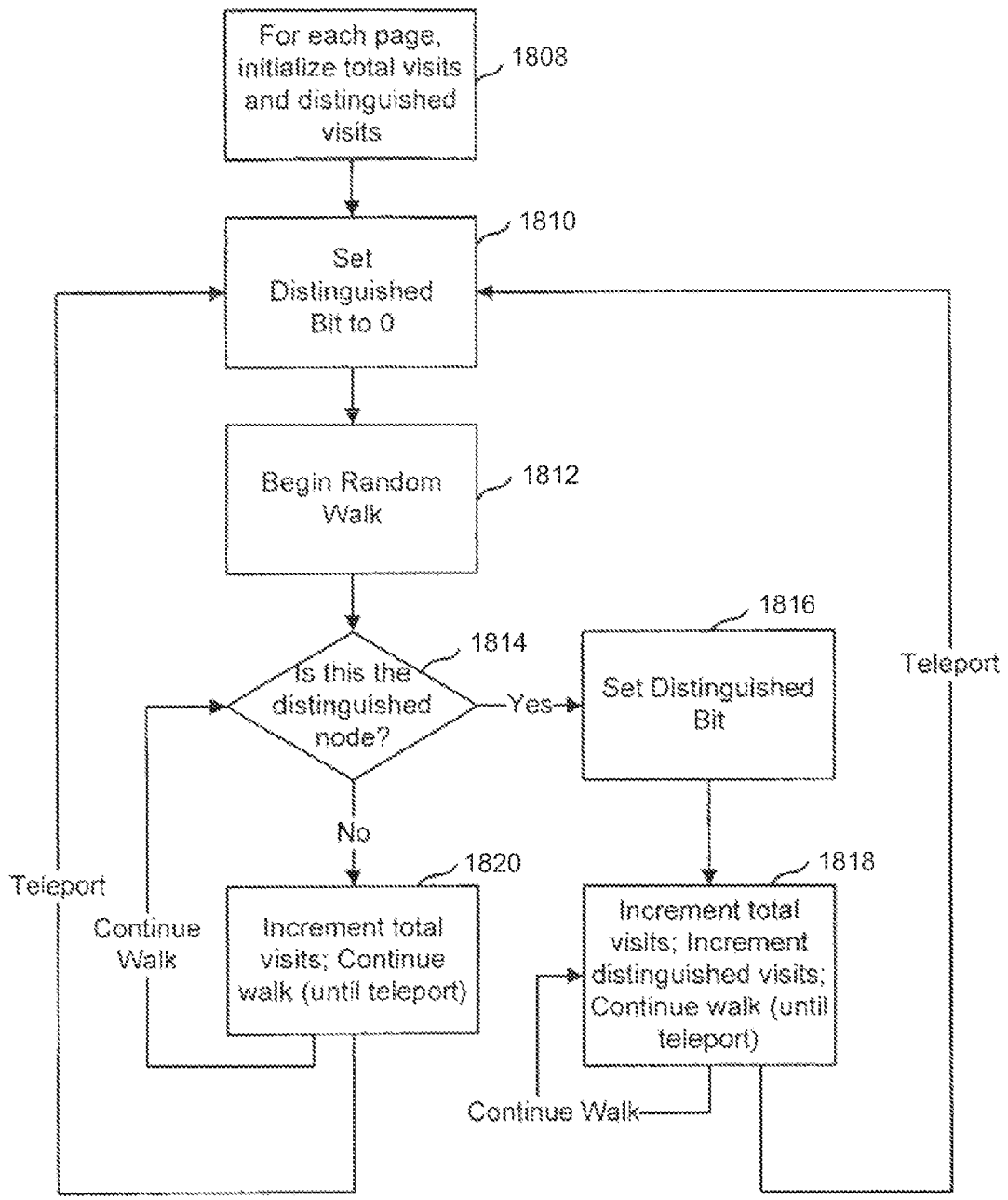
FIG. 18B illustrates a simplified embodiment of a portion of a process for determining the relevance of a document.

FIG. 18B illustrates a simplified embodiment of a portion of a process for determining the relevance of a document. The process depicted in FIG. 18B could be an example of an implementation of portions 1802 and 1804 of FIG. 18A as applied to collection 1502.

A topic score for a destination page can be computed by "counting" the number of times that a distinguished page was encountered before the destination page in a series of natural random walks.

In an example random walk, assume each web page has a total visit counter. Each time the random surfer visits the web page, he increments the page's total visit count by 1. Now assume that the random surfer can carry finite state information along while performing random walks. For example, suppose the random surfer carries around the Boolean variable "Visited_F". The value is initially set to 0. When the random surfer visits a page F, the variable is set to 1. When the random surfer teleports, his states (such as the Visited_F variable) are reset to 0. In this example, page F is a distinguished node.

Each web page has one or more additional counters, such as a counter $Count_F$. When the random surfer visits the web page, he updates the page's counters appropriately based on his state information. In some embodiments, rather than having counts increment by the same value (e.g., 1), the increment values are based at least in part on the distance between the distinguished page and the current page. One method of updating a page's counters is given below in the following pseudocode:

```
/* on visiting Web Page X */
/* increment the Link Score Counter */
  Total_Visits(X)++;
/* do distinguished visit logic (F is a distinguished node)*/
  If(X==F){
    Visited_F=1;
  }
  If (Visited_F){
    CountF(X)++;
  }
/* on teleport */
Visited_F=0;
```

Based on the above pseudocode, the Page Rank of a web page X can be written as follows:

$$P(X) = \frac{Count(X)}{\sum_{i \in Web} Count(i)} \quad (14)$$

The topic score of page X in the topic F can be written as follows:

$$P_F(X) = \frac{Count_F(X)}{\sum_{i \in Web} Count_F(i)} \quad (15)$$

In the example shown, the process begins at 1808 when, for each document in collection 1502, a total visit count and a distinguished visit count are initialized. In this example, a single distinguished page is tracked. As described in more detail below, in some embodiments, multiple pages may be distinguished, and the process is modified accordingly.

One method of initializing the counts is to set both values to 0 for all pages in collection 1502. In some embodiments, other methods are used for initialization, such as by setting specific values for particular pages.

At 1810, the distinguished bit, which tracks whether or not a surfer has visited the distinguished node, is set to 0, indicating that the distinguished node has not yet been visited.

At 1812, a random walk is begun. If an encountered page is the distinguished node (1814), at 1816, the distinguished bit is set, for example to 1. Additionally, the total visits counter and the distinguished visits counters of the distinguished page are incremented (1818). The random walk continues and each subsequently encountered page has its total visit counter and distinguished page counter incremented, until teleport occurs. Upon teleport, the random surfer's distinguished bit is reset to 0 (1810) and a new random walk is begun (1812).

During the random walk, until the distinguished node is visited (1814), each visited page has its total number of visits counter incremented (1820), but does not have its distinguished page counter incremented. In this example, the process terminates when convergence is reached (not shown).

The methods presented in conjunction with FIG. 18B are given in part to help conceptualize a process for computing the relevance of a page. While the equations presented can be used to compute relevance, to do so would require, for each page p, a very large number of computations, especially when collection 1502 is large. As described more fully below, in some embodiments, more efficient processes are employed to calculate scores.

A simplified numeric example of an iterative version of the process shown in FIG. 18B is given in FIGS. 19A-19D to help illustrate the process conceptually. For simplicity of illustration, the values given in FIGS. 19A-19D are not normalized to maintain unity.

Figure 19A:
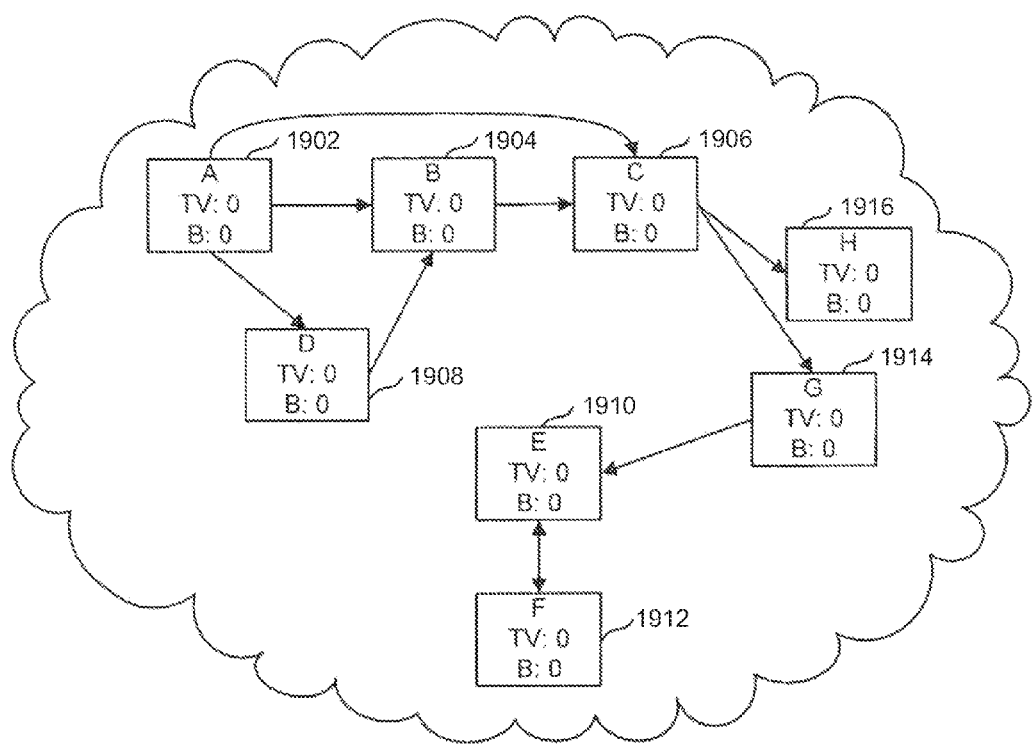
FIG. 19A illustrates a simplified embodiment of a portion of a process for assigning scores to a collection of documents.

FIG. 19A illustrates a simplified embodiment of a portion of a process for assigning scores to a collection of documents. The process depicted in FIG. 19A could be an example of an implementation of portion 1808 of FIG. 18B as applied to collection 1502. In the example shown, nodes A-H (1902-

1916) are included in collection 1502. Node B is a distinguished node. Their total visit counts (represented here as "TV"), and their visits that were preceded by a visit to the distinguished node (represented here as "B") are initialized to 0.

Figure 19B:
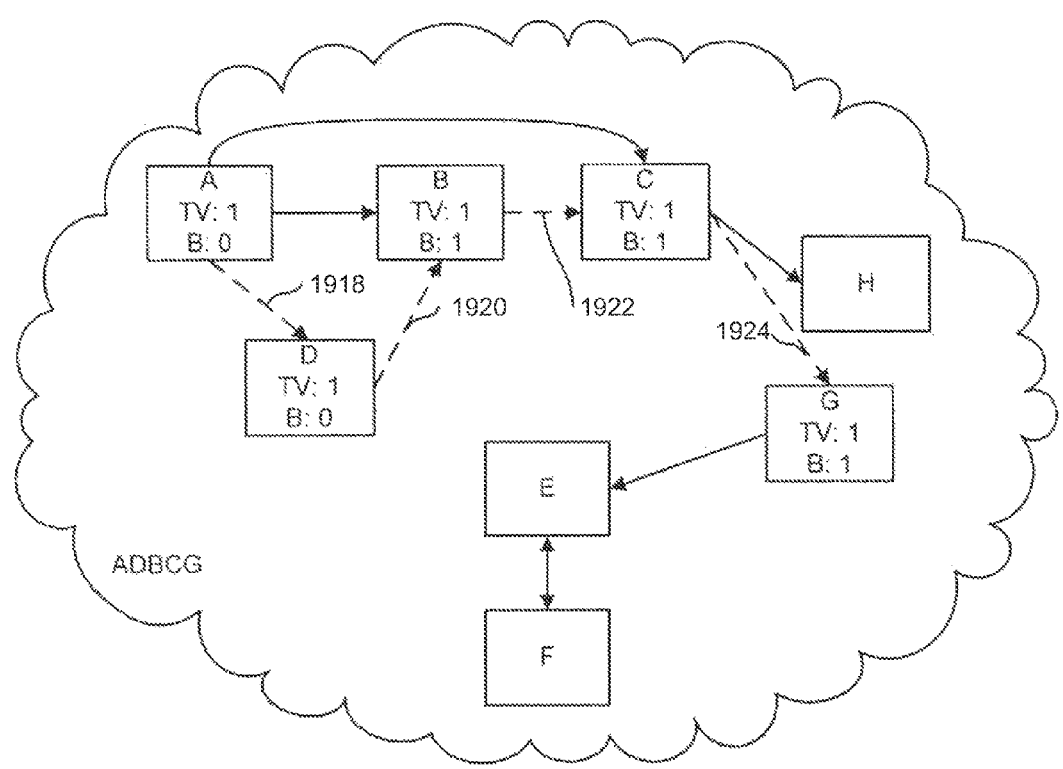
FIG. 19B illustrates a simplified embodiment of a portion of a process for assigning scores to a collection of documents.

FIG. 19B illustrates a simplified embodiment of a portion of a process for assigning scores to a collection of documents. The process depicted in FIG. 19B could be an example of an implementation of portions 1810-1818 of FIG. 18B. The distinguished bit is set to 0 (not shown). A random walk beginning at node A is performed (represented herein as a dashed line). Since node A is not the distinguished node, only its total visit counter is incremented. The second page in the random walk is node D (1918). Node D's total visit count is incremented, but its B count is not, because the random surfer has not yet visited node B. The third page in the walk is node B, the distinguished node (1920). Both of node B's counters are incremented. The fourth page visited in the walk is node C (1922). Both of node C's counters are incremented. The fifth page visited in the walk is node G (1924). Both of node G's counters are incremented.

Figure 19C:
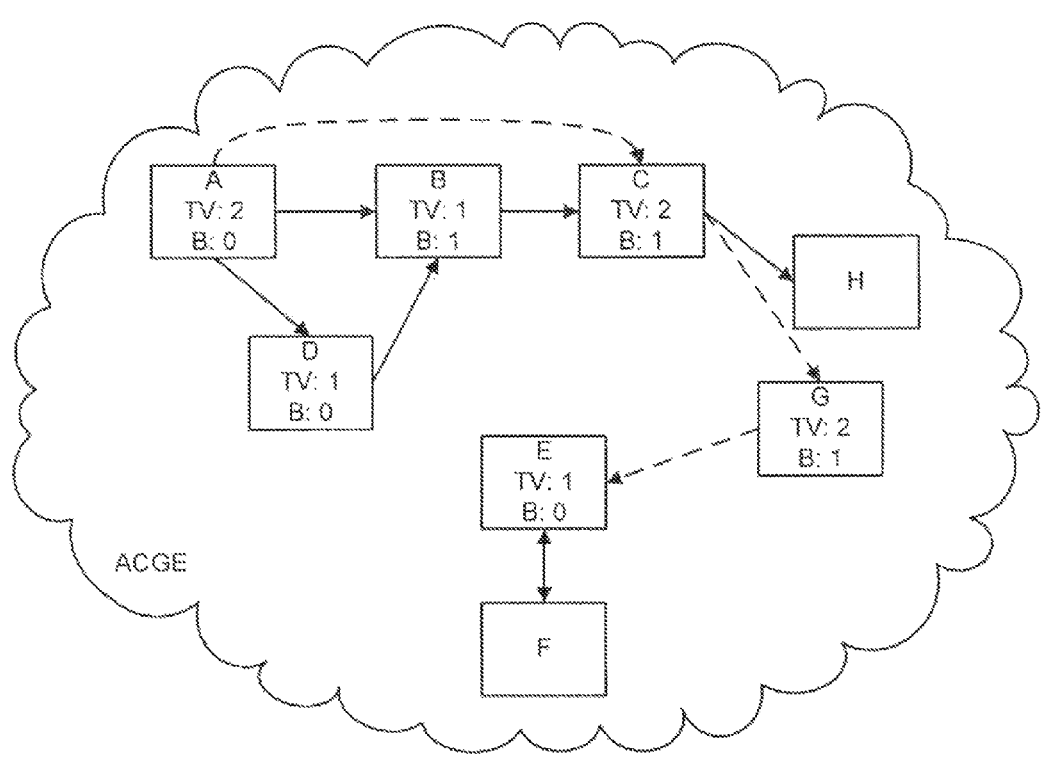
FIG. 19C illustrates a simplified embodiment of a portion of a process for assigning scores to a collection of documents.

FIG. 19C illustrates a simplified embodiment of a portion of a process for assigning scores to a collection of documents. The process depicted in FIG. 19C could be an example of an implementation of portions 1810-1818 of FIG. 18C. After teleporting, the distinguished bit is again set to 0 (not shown). In the random walk shown, the distinguished page, node B, is not encountered before teleport. Thus, each visited page has its total visit counter incremented, but not its B counter.

Figure 19D:
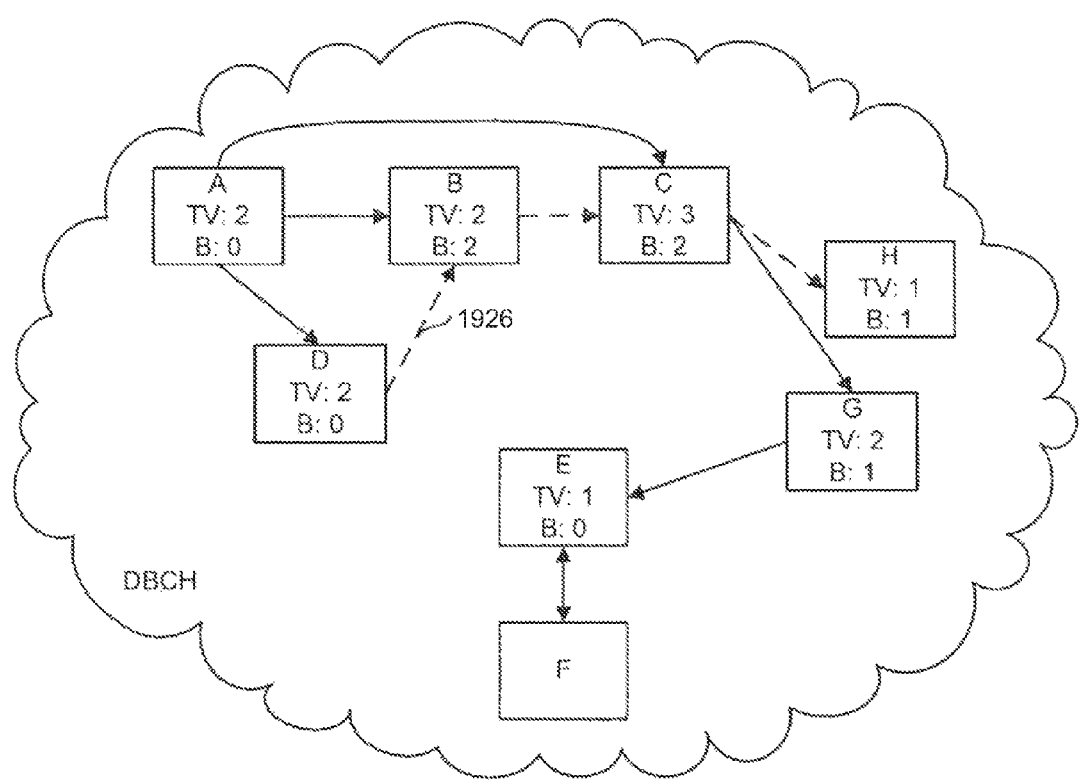
FIG. 19D illustrates a simplified embodiment of a portion of a process for assigning scores to a collection of documents.

FIG. 19D illustrates a simplified embodiment of a portion of a process for assigning scores to a collection of documents. The process depicted in FIG. 19D could be an example of an implementation of portions 1810-1818 of FIG. 18C. After teleporting, the distinguished bit is again set to 0 (not shown). In the random walk shown (this time beginning at node D), page B is encountered as the second page in the walk (1926). Thus, node D has only its total visit counter incremented, while nodes B, C, and H have both counters incremented.

After the processing of FIG. 19D, the following basic relevance has been determined. Node A has a relevance score is 0, or 0 divided by 2. The same holds true for Node D, which has the same score. Node B has a relevance score is 1 (2 divided by 2). Node C has a relevance score of 0.666, or 2 divided by 3. The scores of the other nodes in FIG. 19D can be similarly computed. These scores indicate the percentage of traffic (in the sense of number of visits, not kilobytes) that each node received via node B.

Typically, if one page links to another, it indicates that there is something in common between the two pages. For example, a page containing general information about the sport of football may link to team sites. Similarly, a team page may link to ticket sales, to local information about the city in which the team resides, or to television schedules. However, in some cases, the only commonality between pages in the same natural random walk is that they are in close proximity to each other.

For example, a page containing a salad recipe may link to the restaurant in which the page author first tried such a salad. The restaurant page may in turn link to the page of an artist, whose works are displayed on the restaurant walls. It is possible that a fairly large amount of traffic may flow from the salad recipe page to the artist's page, for example, if the recipe site is well known. Nonetheless, the two pages, one for a salad recipe, and one for a portrait painter, have effectively little to do with each other.

In a random walk R, consider a page X that appears often after F and so has a high topic score. Page X can also appear often, in general, whether or not F precedes it. Page X may thus have little to do with F, outside of the fact that it is "close" to F. A topic score is thus a measure of proximity to F and popularity, not necessarily the relevance to the topic.

For the same two pages X and F, a question can be asked: What is the confidence that X→F? If X appears in a natural random walk, what is the probability that it is preceded by F? If this probability, P(X→F), is large, F appears most of the time X appears. Page X can be seen as a captive of F—since it can only be reached through F, its only purpose is to serve F, and so it must be highly relevant to F. Based on the standard random surfer:

$$P(X \to F) = \frac{\text{Count}_F(X)}{\text{Count}(X)} \quad (16)$$

The ratio of the topic score of X in F to the link score of X can be referred to as $\Delta_F(X)$. The relevance of a page X to a topic F, denoted by $\text{Rel}_F(X)$ can be given as:

$$\text{Rel}_F(X) = P(X \to F) = \frac{\Delta_F(X)}{\Delta_F(F)} \quad (17)$$

The above formulation is independent of the teleportation probability, the memoryless nature of the random walk, etc.

If the natural random walks are viewed as a collection of strings, the result above holds for any collection of strings. The set of strings that can appear as natural random walks is the same as those accepted by the web graph viewed as a finite state automaton (FSA) constructed as follows: Add a new node T that represents teleport to the web graph FSA. Node T has edges to and from every other node in the web graph. Here, every edge is labeled with the destination page's symbol. Thus edge (x,y) has the label y. Node T is the start state and also the success state. The set of strings accepted by this FSA is identical to the set of strings that are the natural random walks on the web graph. In some embodiments, the Markovian world is used to model the frequency of occurrence.

Topic relevance is a probability measure and so has a value between 0 and 1. Thus it should be the case that for all X, $\Delta_F(F) \geq \Delta_F(X)$.

Consider a topic defined by page F, and a given page X, where X is different from F. As determined previously, $$\Delta_F(X) = \frac{P_F(X)}{P(X)}.$$

The Page Rank of X can be defined in terms of X's neighbors:

$$P(X) = \beta \times \sum_{Y \text{ neighbor of } X} \frac{P(Y)}{O(Y)} + \frac{(1-\beta)}{N} \quad (18)$$

Where 1–β is the teleport probability, O(Y) is the number of outlinks of Y, and N is the number of pages in the web graph. In some embodiments, if the Page Rank of X is much larger than the incoming teleportation probability (a fixed number), the contribution of teleportation can be ignored and the equation can be rewritten as:

$$P(X) = \beta \times \sum_{Y \text{ neighbor of } X} \frac{P(Y)}{O(Y)} \qquad (19)$$

Consider now the topic rank of X. Since the random walks are memoryless, the topic rank of X in both cases is the same, if the topic is defined as a single page, as is the case in this example. Given that X is different from F, there is no teleportation to X in the topic definition, thus:

$$P_F(X) = \beta \times \sum_{Y \text{ neighbor of } X} \frac{P_F(Y)}{O(Y)} \qquad (20)$$

Now:

$$\Delta_F(X) = \frac{\sum_{Y \text{ neighbor of } X} \frac{P_F(Y)}{O(Y)}}{\sum_{Y \text{ neighbor of } X} \frac{P(Y)}{O(Y)}} \qquad (21)$$

The "Effective Page Rank" of a page Y, denoted as Q(Y), can be defined as:

$$Q(Y) = \frac{P(Y)}{O(Y)} \qquad (22)$$

Now, $$\Delta_F(X) = \sum_{Y \text{ neighbor of } X} \frac{Q(Y)}{\sum_{Z \text{ neighbor of } X} Q(Z)} \times \Delta_F(Y) \qquad (23)$$

Thus, $\Delta_F(X)$ is the weighted-average of the deltas of all X's neighbors, where the weights are the effective Page Ranks of the neighbors.

A Web Page with a high effective Page Rank is generally more influential in propagating its delta than a page with a low effective Page Rank. Thus, in some embodiments, the seed set includes pages with a high effective Page Rank.

Topic drift can happen when a page with high effective Page Rank and low delta links to a page with a high topic rank. High effective Page Rank pages are topic arbiters, diffusing deltas through the Web Graph.

Topics can be defined using multiple web pages. For simplicity, consider a Topic "F+G" defined by two web pages F and G. Using the natural random walk framework, the topic rank of any page X in this topic F+G is the average of the topic rank of X in F and X in G.

In some embodiments, topics are defined as a property of the general random walk on the web graph, not by defining a new random walk. The notion of topic relevance is one outcome of taking this approach.

For single-page topics, the two approaches end up being the same. This is not the case for multi-page Topics.

First, consider the logic the random surfer adopts for multi-page Topics. For simplicity, assume a two-page Topic defined by pages F and G. The following pseudocode describes the rules that govern the random surfer:

```
/* do distinguished visit logic */
If((X==F)||(X==G)){
Visited_FG=1;
}
If(Visited_FG){
Count_FG(X)++;
}
/* increment the Page Rank Counter */
Count(X)++;
/* on teleport */
Visited_F=0;
```

A topic rank of a page X in topic F+G can be given as:

$$P_{FG}(X) = \frac{\text{Count}_{FG}(X)}{\sum_{J \in Web} \text{Count}_{FG}(J)} \qquad (24)$$

Assume that F and G are mutually exclusive (i.e., G never shows up in a natural random walk with F). This can be written as $P_F(G)=P_G(F)=0$. In this case:

$$P_{FG}(X) = \frac{\text{Count}_F(X) + \text{Count}_G(X)}{\sum_{J \in Web} \text{Count}_F(J)} + \sum_{J \in Web} \text{Count}_G J \qquad (25)$$

It can be shown that:

$$\frac{\sum_{J \in Web} \text{Count}_F(J)}{\sum_{J \in Web} \text{Count}_G(J)} = \frac{\Delta_G(G)}{\Delta_F(F)} \qquad (26)$$

The inverse of $\Delta$ is denoted here by $\Delta^*$. That is, $$\Delta_F^*(F) = \frac{1}{\Delta_F(F)}.$$

Based on the above equations, $$P_{FG}(X) = \frac{\Delta_F^*(F)}{\Delta_F^*(F) + \Delta_G^*(G)} \times P_F(X) + \frac{\Delta_G^*(G)}{\Delta_F^*(F) + \Delta_G^*(G)} \times P_G(X) \qquad (27)$$

In some embodiments, in a multi-page topic, if it is assumed the pages defining the topics are mutually exclusive in the natural random walks, then the topic rank is the weighted average of the topic rank in the corresponding single-page topics. The weights are the corresponding $\Delta^*$s.

The weights for each single-page topic score can be based on its corresponding $\Delta^*$ for it to correspond to a property of the original Random Walk.

If the pages that define the topic are not mutually exclusive, the computation is made more complex. The natural random walks in which F and G both occur will be double counted if the above analysis is used.

Assume F, G, and X, occur exactly once in a natural random walk. It can be shown that the average number of occurrences of any page Y in a natural random walk, given that Y appears at least once, is given by:

$$\frac{P_Y(Y)}{(1-\beta)}.$$

In some embodiments, the X's that are double-counted are backed out. Page X will be double counted where there is both an F and a G preceding the X. The number of X's in the F→G→X sequence is given by: $\text{Count}_A(B) \times P_B(X)$. Similarly, for G→F→X.

For the denominator, sequences of the form F→G→T (teleport) are double counted. Every page in the sub-sequence G→T is double counted. Given that G has occurred, the average number of web pages in G→T is $$\frac{1}{(1-\beta)}.$$

This is similar for sequences of the form G→F→T.
$P_{FG}(X)$ can be written as follows:

$$P_{FG}(X) = \frac{\Delta_F^* \times P_F(X) + \Delta_G^*(G) \times P_G(X) - \Delta_F^*(F) \times P_F(G) \times P_G(X) - \Delta_G^*(G) \times P_G(F) \times P_F(X)}{\Delta_F^*(F) + \Delta_G^*(G) - \frac{\Delta_F^*(F) \times P_F(G)}{(1-\beta)} - \frac{\Delta_G^*(G) \times P_G(F)}{(1-\beta)}} \quad (28)$$

Given a web page X, for all possible topics F, give the confidence and support that X belongs to F. In this example, assume that topics are defined by a single web page. For example, consider only those natural random walks where X appears. One way to find the set of pages F that consistently precede X in these natural random walks is to first focus on topic relevance. If when X appears in a natural random walk it is preceded by F with high probability, then X→F. Now, given X, what are the Fs that precede it with high probability?

One way to solve this problem is to create a dual web graph. The nodes of the dual web graph are the web pages, just like in the original web page. However, the directionality of all links in the original web graph are inverted. Thus all inlinks in the original web graph are now outlinks in the dual web graph and vice versa. The random walk on this dual web graph can be denoted by $R^D$.

One property satisfied by $R^D$ is that every natural random walk that appears in R appears reversed in $R^D$, and the same number of times. $R^D$ preserves Page Rank. This property in Markov Chains is called "reversibility". If the natural random walks are strings, in the dual, all of the strings are reversed. R and $R^D$ are said to be reversible, if and only if:

$$P(j) \times \pi(j,k) = P^D(k) \times \pi^D(k,j) \quad (29)$$

Here, P(j) is the Page Rank of j, $P^D(k)$ is the Page Rank of k in the Dual Web Graph, and $\pi(j,k)$ is the probability that edge (j,k) is followed. When R and $R^D$ are reversible, by definition $P^D(k) = P(k)$. Thus:

$$P(j) \times \pi(j,k) = P(k) \times \pi^D(k,j) \quad (30)$$

The transition probabilities in the dual web graph, $\pi^D(k,j)$ can be defined as follows:

$$\pi^D(k, j) = \frac{\beta \times P(j)}{O(j) \times P(k)} \quad (31)$$

where O(j) is the number of outlinks of j. All the outbound probabilities (including teleportation) from a page sum to 1:

$$\sum_{l \text{ neighbor of } k} \pi_D(k, 1) + T_O^D(k) = 1 \quad (32)$$

Here, $T_O^D(k)$ is the probability of teleportation out of k in the dual web graph. Teleportation is defined differently in the dual web graph:

$$T_O^D(k) = \frac{(1-\beta)}{(N \times P(k))} \quad (33)$$

Teleportation is more likely out of lower Page Rank nodes in $R^D$. If all pages have equi-probability 1/N, then the outbound teleportation probability becomes what is seen in the standard Page Rank algorithm.

To determine $T_I^D(k)$, the teleportation probability into page k, consider P(k) in the dual web graph:

$$P(k) = \sum_{l \text{ neighbor of } k} P(1) \times \pi^D(1, k) + T_I^D(k) \quad (34)$$

Substituting for $\pi^D(1,k)$:

$$T_I^D(k) = (1-\beta) \times P(k) \quad (35)$$

Teleportation in the dual web graph thus behaves as follows: teleport occurs out of any page k with probability:

$$\frac{(1-\beta)}{(N \times P(k))}.$$

Once teleportation out occurs, teleportation into any page j on the web can occur with probability proportional to its Page Rank P(j). The probability of teleport, across all pages, just as with the original web graph is $(1-\beta)$.

FIG. 20 is a table illustrating properties of walks. Assuming the probability of teleport into any page is proportional to its Page Rank, the desired incoming teleport probability for the page can be obtained.

Given a page X, for every possible topic (e.g., page) F on the web, what is $P_F(X)$ and $\text{Rel}_F(X)$? Given a topic page F, the topic rank and the topic relevance for every Page can be computed based on this topic F.

Given any page X, it is possible to find its topic score and topic relevance for every possible topic F. Consider A, an N×N matrix, where $A[j,k] = \text{Rel}_k(j)$. Here, topics (as defined by web pages) are the columns and web pages are the rows. The diagonal of this matrix is 1 (since $\text{Rel}_k(k)=1$). A is an N×N matrix since in this example every web page also defines a topic. The dual random walk can be used to determine the values of all elements in a given row of the matrix.

For the analysis below, assume that no page appears more than once in any natural random walk. Example identities between the regular random walk and the dual random walk follow. $P(X) = P^D(X)$ (Page Rank is conserved). Thus, Count$(X) = \text{Count}^D(X)$. By reversing strings the number of times any symbol appears does not change.

The number of regular natural random walks in which F appears followed by X is the same as the number of dual natural random walks in which X appears followed by F.

Further, since no page appears more than once in a natural random walk (regular or dual): $\text{Count}_F(X) = \text{Count}_X^D(F)$.

Example: Consider the Natural Random Walks (strings): FCX, XF, CD. Here, the Dual Random Walks are the reverse: XCF, FX, DC. Now, $\text{Count}_F(X)=1$ (only in string FCX does F precede X). And, $\text{Count}_X^D(F)=1$ (only in string XCF does X precede F).

Consider now the identity: $\text{Count}_F(X) = \text{Count}_X^D(F)$;

$$\frac{\text{Count}_F(X)}{\text{Count}(X)} = \frac{\text{Count}_X^D(F)}{\text{Count}^D(X)}.$$

Thus, $$Rel_F(X) = \frac{\text{Count}_X^D(F)}{\sum_{i \in Web}\text{Count}_X(i)} \times \frac{\sum_{i \in Web}\text{Count}_X(i)}{\text{Count}^D(X)}.$$

Since $\text{Count}^D(X) = \text{Count}_X^D(X)$, $$Rel_F(X) = \frac{P_X^D(F)}{P_X^D(X)} \tag{36}$$

The topic relevance of X in topic F is proportional to the topic rank of F in topic X in the dual web graph. One way of computing the topic relevance of X in every topic on the web is as follows: First, construct the dual web graph as given in the previous section. Next, select web page X as the topic. Next, compute the topic ranks of every web page for topic X in the dual web graph using the standard method of computing topic ranks. Finally, apply the formula above to get the topic relevance of X in every topic.

Now, consider the Dual Web Graph, and consider in particular: $Rel_F^D(X)$. In some embodiments, the above formula is used, noting that the dual of the dual web graph is the regular web graph. Thus:

$$\frac{P_X(F)}{P_X(X)} = Rel_F^D(X) \tag{37}$$

The topic rank of X in all topics F can thus be computed by computing the topic relevance of F in topic X in the dual web graph.

Figure 21:
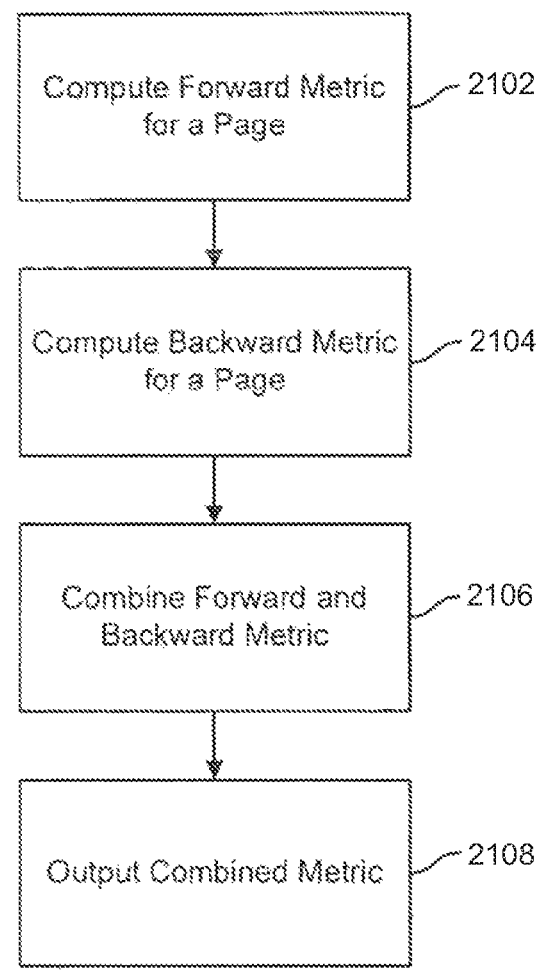
FIG. 21 is illustrates an embodiment of a process for scoring a document.

FIG. 21 is illustrates an embodiment of a process for scoring a document. The process may be implemented in link analysis engine 1508. The process begins at 2102 when a forward metric, such as the topic relevance of F in topic X is computed in usual manner. At 2104, the metric is computed in the dual graph. At 2106, the forward and backward metrics are combined. The metrics may be combined in a variety of ways. For example, a product of the metrics may be taken. The metrics may also be weighted—for example, with the forward metric weighted more than the backward metric. The process ends at 2108 when the combined metrics are outputted, for example, into a relation.

Consider creating an Oakland Raiders topic. The Oakland Raiders website appears like the right page to use to define this topic. Unfortunately, the site is not much of a hub page—it has few outlinks and is more of an "authority" page—one that hubs point to.

In general, a Web Page has both Hub and Authority components. In the formulations above, topic computations are hub-based. However, authority web pages can also be used.

Given a Web Page F that defines the Topic, and any page X, an authority topic rank ($P_F^A(X)$) and authority topic relevance ($Rel_F^A(X)$) can be defined as follows. Here, the superscript A and H to refer to Authority and Hub variants respectively. A topic notation without a superscript is assumed to involve hubs:

$$P_F^A(X) = Rel_X^H(F) = Rel_X(F) \tag{38}$$

$$Rel_F^A(X) = P_X^H(F) = P_X(F) \tag{39}$$

Consider the topic web page F and the random surfer. Assume the random surfer has a Visited_j variable for every web page J. If for any web page X, $\text{Count}_X(F)$ (the number of visits to F that were preceded by a visit to X), is a significant fraction of $\text{Count}(F)$ (the total number of visits to F), X is a significant source of traffic to F. This is a popularity metric—while X may account for a lot of F's traffic, X may just be a general high-traffic site and may not be particularly relevant to F. A measure of topic relevance is needed: if a random surfer visits X, with high probability he visits F, which is given by the hub topic rank of F in X.

In some embodiments, the authority topic rank and relevance of any page X for a given topic F are the same (within a constant factor) as the hub topic rank and relevance of the page X in topic F in the dual web graph. The constant factor can be derived by approximating $P_X(X)$ by $(1-\beta)$—the probability of teleport.

When there is a page for which a topic is to be computed, both hub and authority topics can be computed and the scores combined appropriately when search results are ranked.

Topic relevance can be computed with respect to seed sets of any size. Instead of stating the definition of topic relevance in terms of a single random walker, a large collection of random walkers can be employed.

Suppose a web graph has N nodes. Hypothetical random surfers pursue random walks on the web with a teleport parameter $\beta$ (i.e., the probability of teleport at each step is $1-\beta$). Suppose that the number M of such random walkers is very large, i.e., M>>N and the random walks have settled to equilibrium distributions.

The Page Rank of a page p is the fraction of the total number of random walkers that are on p at any point in time. Using r to denote the Page Rank vector, and r(p) to denote the Page Rank of page p, suppose the number of random surfers at page p is M(p). Then, $$r(p) = \frac{M(p)}{M} \tag{40}$$

Now suppose a set S of seed pages is selected for a topic. In some embodiments, each random surfer is in one of two states: relevant and irrelevant. Here, each surfer is initially in the irrelevant state. When a surfer visits a seed set page, his state changes to relevant (independent of his prior state). These surfers are referred to herein as relevant surfers. When a surfer teleports at random, his state changes to irrelevant. These surfers are referred to herein as irrelevant surfers.

At any time t, the number of relevant surfers at node p can be denoted as $M_R(p)$. The relevance of p is the fraction of the surfers at p who are relevant. The relevance vector is denoted x and the relevance of p is denoted x(p). Then:

$$x(p) = \frac{M_R(p)}{M(p)} \qquad (41)$$

If p∈S, then $M_R(p)=M(p)$, and so $x(p)=1$.

Of these random surfers, let M'(p) denote the number that got to b by following a link (i.e., those that did not teleport directly to p). The non-teleport Page Rank (NTPR) of p, denoted r'(p) can be defined as:

$$r'(p) = \frac{M'(p)}{M} \qquad (42)$$

Figure 22:
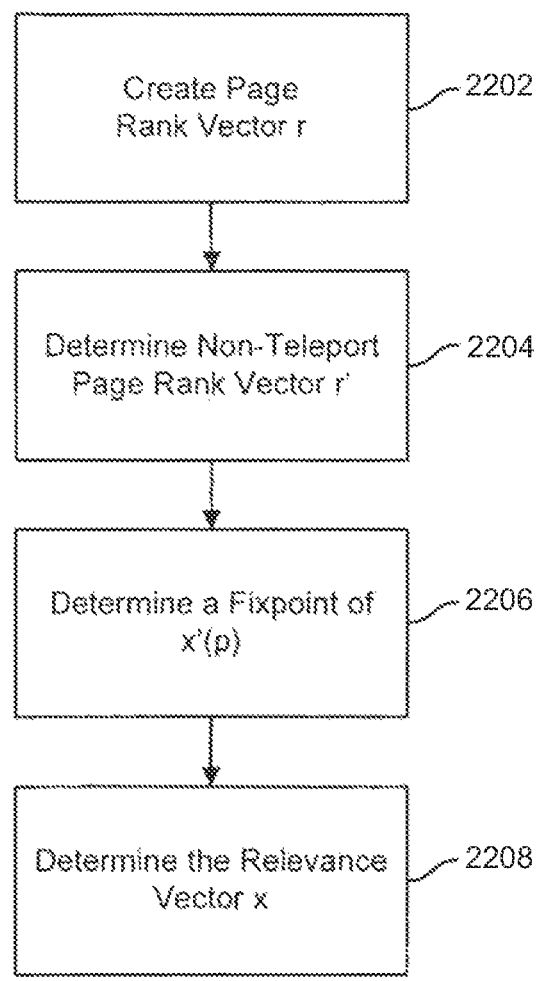
FIG. 22 illustrates an embodiment of a process for determining a relevance vector.

FIG. 22 illustrates an embodiment of a process for determining a relevance vector. This process may be implemented in link analysis engine 1508. In the example shown, the process begins at 802 when a typical Page Rank vector r is determined.

At 2204, a non-teleport Page Rank vector r' is determined. There is a relationship between r and r'. Since there are M random surfers, at any time step (1−β)M teleport. Since the teleports are uniformly at random, the number of surfers who teleport into p at any time step is $$(1-\beta)\frac{M}{N}.$$

Therefore:

$$M'(p) = M(p) - \frac{1-\beta}{N}M \qquad (43)$$

And thus, the following is one way of determining the NTTP:

$$r'(p) = r(p) - \frac{1-\beta}{N} \qquad (44)$$

The non-teleport topic relevance (NTTR) of p, denoted by x'(p) can be defined as follows:

$$x'(p) = \frac{M_R(p)}{M'(p)} \qquad (45)$$

In this example, if p∈S, $M_R(p)=M(p)>M'(p)$, and so $x'(p) > 1$. The following formula relates x(p) and x'(p):

$$x'(p) = \frac{M_R(p)}{M'(p)} \qquad (46)$$
$$= \frac{M_R(p)}{M(p) - \frac{1-\beta}{N}M}$$

This can be simplified, noting that $$\frac{M}{M(p)} = \frac{1}{r(p)},$$

as follows:

$$x(p) = \left(1 - \frac{1-\beta}{Nr(p)}\right)x'(p) \qquad (47)$$

A recursive formula can be derived that relates the NTTR of a node to that of its neighbors. This formula can be used as the basis of a graph computation for NTTR.

Consider the relevant surfers at page p S at time t+1. The number of surfers at p is M(p), and the number of relevant surfers is $M_R(p)=x'(p)M'(p)$. The in-neighbors and out-neighbors of p can be denoted I(p) and O(p), respectively. In this example, each of these surfers came from an in-neighbor of p. Suppose q∈I(p). At time t, the number of random surfers at q is M(q), and the number of relevant random surfers is $M_R(q)=x'(q)M'(q)$. Of these relevant surfers, a fraction β follows outlinks and a fraction 1−β teleports out of q. The number of relevant surfers from q that land up at p at time t+1 is therefore $$\frac{\beta}{|O(q)|}M_R(q) = \frac{\beta}{|O(q)|}x'(q)M'(q).$$

Thus, at equilibrium:

$$x'(p)M'(p) = \sum_{q\in I(p)} \frac{\beta}{|O(q)|}x'(q)M'(q) \qquad (48)$$

Dividing through by M, and using $$r'(p) = \frac{M'(p)}{M},$$

this can be rewritten as:

$$x'(p)r'(p) = \sum_{q\in I(p)} \frac{\beta}{|O(q)|}x'(q)r'(q) \qquad (49)$$

It was previously assumed that p∉S. If p∈S, then x(p) is 1. Thus, the following recursive formula for x'(p) can be given:

$$x'(p) = \begin{cases} \frac{1}{1-\frac{1-\beta}{Nr(p)}} & \text{if } p \in S \\ \frac{1}{r'(p)}\sum_{q\in I(p)} \frac{\beta}{|O(q)|}x'(q)r'(q) & \text{if } p \notin S \end{cases} \qquad (50)$$

At 2206, a link-based graph computation is used to compute a fixpoint for the recursive equation given above. In some embodiments, pages in the set S are initialized to non-zero values, and the other nodes are initialized to 0.

At 808, the relevance vector x is computed, for example, using $$x(p) = \left(1 - \frac{1-\beta}{Nr(p)}\right)x'(p)$$

as described above.

A matrix equation for NTTR can be used. Define an N×N matrix R and N×1 vector $x'_0$ as follows:

$$R_{pq} = \begin{cases} \frac{\beta}{|O(q)|} \frac{r'(q)}{r'(p)} & \text{if } p \in S \text{ and } q \in I(p) \\ 0 & \text{otherwise} \end{cases} \quad (51)$$

$$x'_0(p) = \begin{cases} \frac{1}{1 - \frac{1-\beta}{Nr(p)}} & \text{if } p \in S \\ 0 & \text{otherwise} \end{cases}$$

The recursive formula previously given (Eq. 14) can be rewritten as the following linear matrix equation (a Sylvester Equation):

$$x' = Rx' + x'_0 \quad (52)$$

In this example, the matrix R is not stochastic, unlike the corresponding matrix A in the Page Rank equation. Correspondingly, relevance vector x' is also not a probability vector.

Multiple topics can be organized into a topic hierarchy. For example, a topic hierarchy can be implemented in a tree or a DAG, with the children of a node (e.g., football, basketball), being subtopics of the parent (e.g., sports). As described in more detail below, the relevance of each page with respect to each topic in the hierarchy can be computed.

"Children's health" is an example subtopic of "health." Consider a search, such as "music," in the context of children's health. In some cases, high on the results list might be pages about music as it relates to general health. This is because pages that are relevant to general health may also obtain good relevance scores for children's health, due to topic drift.

Hierarchical topic relevance can be used to minimize topic drift by taking advantage of information encoded in the topic hierarchy.

Suppose a web graph has N nodes and there are a large number of random surfers pursuing random walks on the web, with teleport parameter $\beta$ (i.e., probability of teleport at each step is $1-\beta$). Suppose that the number M of such random walkers is very large, i.e., M>>N, and the random walks have settled to equilibrium.

The typical Page Rank of a page p is the fraction of the total number of random walkers that are on p at any point in time. Using r to denote the Page Rank vector, and r(p) to denote the Page Rank of page p, suppose the number of random surfers at page p is M(p). Then:

$$r(p) = \frac{M(p)}{M} \quad (53)$$

Suppose there is a topic hierarchy H, organized as a tree or as a DAG. In this example, there is a seed set of pages associated with every topic T in the hierarchy. Here, the seed set for a topic includes the seed sets of all of its subtopics, but may contain additional pages that are not in the seed sets of any of its subtopics. A pair of topics in this example is said to be unrelated if neither is an ancestor or descendant of the other. In other cases, these assumptions are not strictly adhered to. For example, other seed sets may be used as applicable.

Consider some topic T in H, and denote its seed set by S(T). Associated with each topic is also an excluded set of pages, which is denoted by E(T). In this case, the excluded set contains pages that are known not to belong to topic T. One way to construct E(T) is to set it equal to the union of the seed sets of all the topics in the hierarchy that are not subtopics of T (in particular, E(T)) includes the seed sets of the ancestors of T). Here, generically popular pages, such as Yahoo.com and Google.com are included in the seed set of the root of the hierarchy.

Suppose that each random surfer is in one of two states: relevant, and irrelevant. Initially, each surfer is in the irrelevant state. In some embodiments, surfers follow the following rules. When a surfer visits a seed set page, his state changes to relevant (independent of his prior state). These surfers are referred to herein as relevant surfers. When a surfer teleports at random, his state changes to irrelevant. These surfers are referred to herein as irrelevant surfers. When a surfer visits an excluded page, his state changes to irrelevant.

At any time t, let $M_R(p)$ denote the number of relevant surfers at node p. the relevance of p is the fraction of the surfers at p who are relevant. The relevance vector is denoted here by x and the relevance of p is denoted by x(p). Then:

$$x(p) = \frac{M_R(p)}{M(p)} \quad (54)$$

If $p \in S(T)$, then $M_R(p) = M(p)$, and so $x(p) = 1$. If $p \in E(T)$, then $x(p) = 0$.

The iterative process described above can be modified to compute hierarchical topic relevance. One way this can be accomplished is by modifying the manner in which the excluded set is treated. The values for the excluded set can be pinned at 0 and not updated in the usual manner. At the 806 in this modified scheme, hierarchical topic relevance will have been computed.

Another approach is to estimate hierarchical relevance using the ordinary relevance. In the case where the excluded set contains a single page, a closed formula can be derived. In some embodiments, the matrix formulation of relevance is extended to incorporate excluded pages.

In some embodiments, instead of setting the relevance of the excluded pages to zero, set their relevance to a small non-zero value. A different value for each excluded page may be used, for example, depending on the relatedness of topics in the hierarchy.

In some embodiments, instead of (or in addition to) the excluded set, compute a value for each page that expresses its contribution to topic drift. This number may be measured in a manner similar to source scores in DIFR and will make relevance into a double-iterative algorithm like DIFR.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method of delivering a search result comprising:
assigning destination scores to a document with respect to a plurality of categories based on a plurality random walks of a linked corpus including the document with random teleportation hops biased toward a plurality of seed sets corresponding to the plurality of categories;

assigning source scores to the document with respect to the plurality of categories, the source scores for the document indicating a contribution of the document to one or more destination scores of other nodes in the linked corpus;

assigning combined scores to the document based on a combinations of the destination and source scores;

associating a category of the plurality of categories with the document based at least in part on the combined scores;

obtaining a search query; and delivering a plurality of search results to a user in a manner that includes an indication to the user of at least one category associated with each search result of the plurality of search results, wherein each search result of the plurality of search results is accompanied by one or more controls configured to:

allow the user to selectively refine whether additional results from the at least one associated category should be displayed or excluded, and allow the user to selectively display or exclude all results from a particular associated category.

2. The method of claim 1 wherein a category is associated with a document by tagging meta information associated with the document with the category.

3. The method of claim 1 wherein the indication of at least one category is based at least in part on applying a threshold.

4. The method of claim 1 wherein results are delivered in a relevance view, wherein results are ranked and displayed to the user, irrespective of category.

5. The method of claim 1 wherein results are delivered in a category view, wherein a first category is displayed in response to the search query, and wherein a second category less relevant to the search query than the first category and not displayed in response to the search query is displayed based at least in part on a user manipulation of the one or more controls.

6. The method of claim 1 further comprising refining the results based at least in part on a user interaction.

7. The method of claim 1 further comprising refining the results based at least in part on a user selection of a category.

8. The method of claim 1 further comprising refining the results based at least in part on a user exclusion of a category.

9. The method of claim 1 further comprising refining the results dynamically, without performing a new search.

10. The method of claim 1 wherein the associated category is determined after obtaining the search query.

11. The method of claim 1 wherein the associated category is formed by performing one or more operations on a plurality of base categories.

12. The method of claim 1 wherein the associated category is a virtual flavor.

13. The method of claim 1 wherein the associated category is based at least in part on a union of flavors.

14. The method of claim 1 wherein the associated category is based at least in part on an intersection of flavors.

15. The method of claim 1 wherein the associated category is based at least in part on an exclusion.

16. The method of claim 1 wherein the score includes a topic relevance score.

17. The method of claim 1 wherein at least one category is obtained from a directory service.

18. A system for delivering a search result, including:

a processor; and a memory coupled with the processor, wherein the memory is configured to provide the processor with instructions which when executed cause the processor to:

assign destination scores to a document with respect to a plurality of categories based on a plurality random walks of a linked corpus including the document with teleportation hops biased toward a plurality of seed sets corresponding to the plurality of categories assign source scores to the document with respect to the plurality of categories, the source scores for the document indicating a contribution of the document to one or more destination scores of other nodes in the linked corpus;

assign combined scores to the document based on a combinations of the destination and source scores;

associate a category of the plurality of categories with the document based at least in part on the combined scores;

obtain a search query; and delivering a plurality of search results to a user in a manner that includes an indication to the user of at least one category associated with each search result of the plurality of search results, wherein the plurality of search results are accompanied by one or more controls configured to:

allow the user to selectively refine whether additional results from the at least one associated category should be displayed or excluded, and allow the user to selectively display or exclude all results from a particular associated category.

19. A computer program product for delivering a search result, the computer program product being embodied in a computer readable storage medium and comprising computer instructions for:

assigning scores to a document with respect to a plurality of categories based on a plurality random walks of a linked corpus including the document with random teleportation hops biased toward a plurality of seed sets corresponding to the plurality of categories;

assigning source scores to the document with respect to the plurality of categories, the source scores for the document indicating a contribution of the document to one or more destination scores of other nodes in the linked corpus;

assigning combined scores to the document based on combinations of the destination and source scores;

associating a category of the plurality of categories with the document based at least in part on the combined scores;

obtaining a search query; and delivering a plurality of search results to a user in a manner that includes an indication to the user of at least one category associated with each search result of the plurality of search results, wherein the plurality of search results are accompanied by one or more controls configured to:

allow the user to selectively refine whether additional results from the at least one associated category should be displayed or excluded, and allow the user to selectively display or exclude all results from a particular associated category.

20. The method of claim 1 wherein a particular search result is associated with a plurality of categories, and wherein the controls associated with the particular search result are configured to allow the user to independently include or exclude additional results from each of the respective categories in the plurality of categories.

* * * * *

UNITED STATES PATENT AND TRADEMARK OFFICE
CERTIFICATE OF CORRECTION

| | | |
|---|---|---|
| PATENT NO. | : 8,849,830 B1 | Page 1 of 1 |
| APPLICATION NO. | : 11/580521 | |
| DATED | : September 30, 2014 | |
| INVENTOR(S) | : Seshadri Srinivasan et al. | |

It is certified that error appears in the above-identified patent and that said Letters Patent is hereby corrected as shown below:

On the Title Page Item (60) should read,

Related U.S. Application Data

Provisional Application No. 60/726,828, filed on Oct. 14, 2005.

Signed and Sealed this
Tenth Day of February, 2015

Michelle K. Lee
*Deputy Director of the United States Patent and Trademark Office*